(12) United States Patent
Yushin et al.

(10) Patent No.: US 10,340,520 B2
(45) Date of Patent: Jul. 2, 2019

(54) NANOCOMPOSITE BATTERY ELECTRODE PARTICLES WITH CHANGING PROPERTIES

(71) Applicant: Sila Nanotechnologies Inc., Alameda, CA (US)

(72) Inventors: Gleb Yushin, Atlanta, GA (US); Eugene Michael Berdichevsky, Oakland, CA (US); Alexander Thomas Jacobs, Oakland, CA (US); Alper Nese, Alameda, CA (US); Damian Harris, San Francisco, CA (US); Bogdan Zdyrko, Clemson, SC (US)

(73) Assignee: Sila Nanotechnologies, Inc., Alameda, CA (US)

( * ) Notice: Subject to any disclaimer, the term of this patent is extended or adjusted under 35 U.S.C. 154(b) by 47 days.

(21) Appl. No.: 14/882,166

(22) Filed: Oct. 13, 2015

(65) Prior Publication Data

US 2016/0104882 A1    Apr. 14, 2016

Related U.S. Application Data

(60) Provisional application No. 62/063,493, filed on Oct. 14, 2014.

(51) Int. Cl.
*H01M 4/38* (2006.01)
*H01M 4/13* (2010.01)
(Continued)

(52) U.S. Cl.
CPC ............. *H01M 4/388* (2013.01); *H01M 4/13* (2013.01); *H01M 4/362* (2013.01); *H01M 4/386* (2013.01);
(Continued)

(58) Field of Classification Search
None
See application file for complete search history.

(56) References Cited

U.S. PATENT DOCUMENTS 5,820,965 A    10/1998    Pyzik et al.
5,888,670 A    3/1999    Kawakami
(Continued)

FOREIGN PATENT DOCUMENTS

EP    1352436 B1    8/2008
WO    2015081238 A1    6/2015
(Continued)

OTHER PUBLICATIONS

International Search Report and Written Opinion dated Jan. 8, 2016 in International Application No. PCT/US2015/055518.
(Continued)

*Primary Examiner* — Wyatt P McConnell
(74) *Attorney, Agent, or Firm* — Steven Driskill

(57) ABSTRACT

Battery electrode compositions and methods of fabrication are provided that utilize composite particles. Each of the composite particles may comprise, for example, a high-capacity active material and a porous, electrically-conductive scaffolding matrix material. The active material may store and release ions during battery operation, and may exhibit (i) a specific capacity of at least 220 mAh/g as a cathode active material or (ii) a specific capacity of at least 400 mAh/g as an anode active material. The active material may be disposed in the pores of the scaffolding matrix material. According to various designs, each composite particle may exhibit at least one material property that changes from the center to the perimeter of the scaffolding matrix material.

29 Claims, 25 Drawing Sheets

(51) Int. Cl.
  *H01M 4/36* (2006.01)
  *H01M 4/62* (2006.01)
  *H01M 10/0525* (2010.01)
  *H01M 4/04* (2006.01)

(52) U.S. Cl.
  CPC .......... *H01M 4/625* (2013.01); *H01M 4/0402* (2013.01); *H01M 10/0525* (2013.01)

(56) References Cited

U.S. PATENT DOCUMENTS

| | | | |
|---|---|---|---|
| 8,450,012 | B2 | 5/2013 | Cui et al. |
| 8,637,185 | B2 | 1/2014 | Berdichevsky et al. |
| 2002/0055040 | A1 | 5/2002 | Mukherjee et al. |
| 2006/0234127 | A1 | 10/2006 | Kim et al. |
| 2010/0055459 | A1 | 3/2010 | Desimone et al. |
| 2011/0104571 | A1 | 5/2011 | Zhamu et al. |
| 2011/0171502 | A1 | 7/2011 | Kottenstette et al. |
| 2012/0100438 | A1 | 4/2012 | Fasching et al. |
| 2012/0202112 | A1 | 8/2012 | Yushin et al. |
| 2012/0251886 | A1 | 10/2012 | Yushin et al. |
| 2012/0321959 | A1 | 12/2012 | Yushin et al. |
| 2012/0321961 | A1 | 12/2012 | Yushin et al. |
| 2012/0328952 | A1 | 12/2012 | Yushin et al. |
| 2013/0224594 | A1 | 8/2013 | Yushin et al. |
| 2013/0330630 | A1 | 12/2013 | Christensen et al. |
| 2013/0344391 | A1 | 12/2013 | Yushin et al. |
| 2014/0057179 | A1 | 2/2014 | Yushin et al. |
| 2014/0287301 | A1 | 9/2014 | Yushin et al. |
| 2015/0064568 | A1 | 3/2015 | Yushin et al. |
| 2015/0155546 | A1 | 6/2015 | Yushin et al. |

FOREIGN PATENT DOCUMENTS

| | | |
|---|---|---|
| WO | 2015081238 A9 | 6/2015 |
| WO | 2015168367 A1 | 11/2015 |

OTHER PUBLICATIONS

G. Yushin et al., "Deformations in Si—Li Anodes Upon Electrochemical Alloying in Nano-Confined Space," Journal of the American Chemical Society, Published on the Web, Jun. 8, 2010.

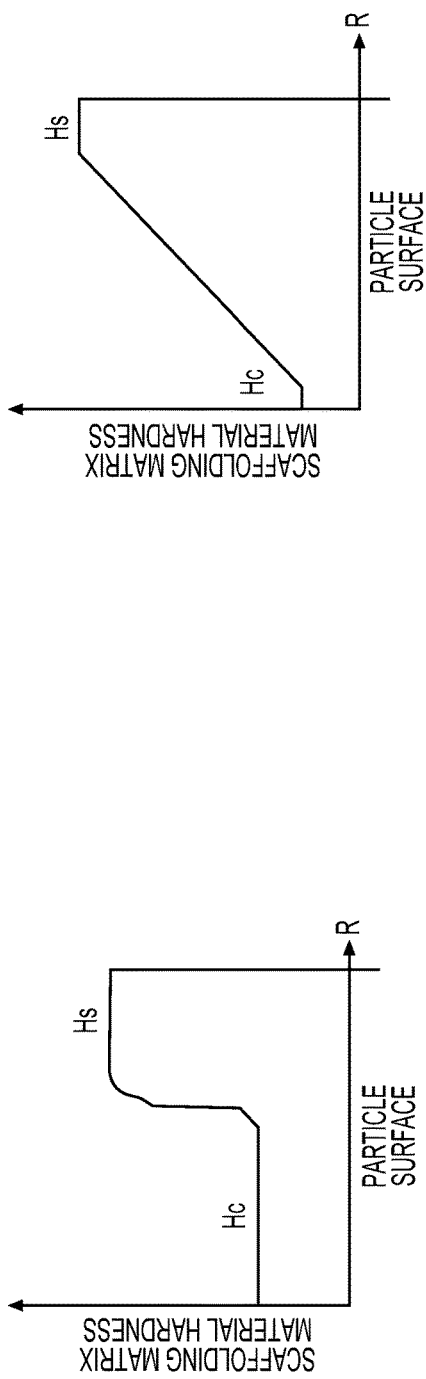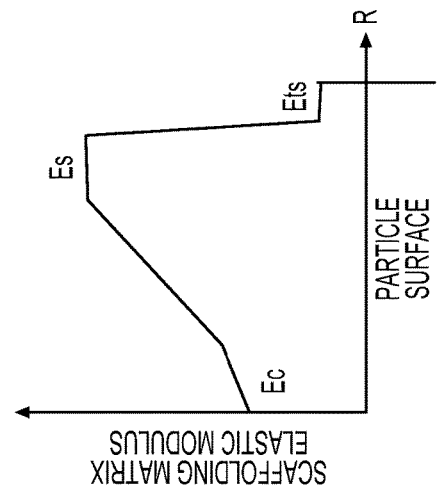

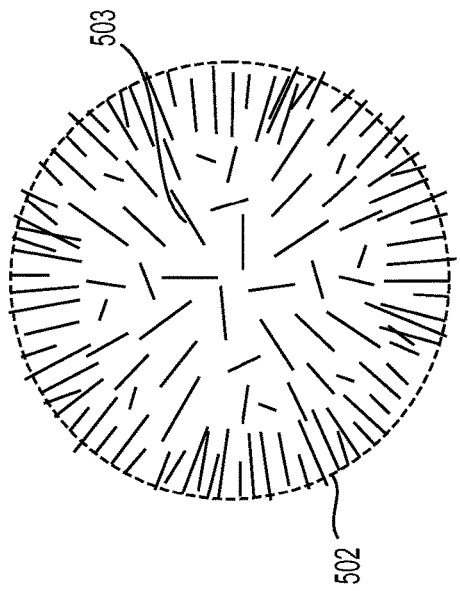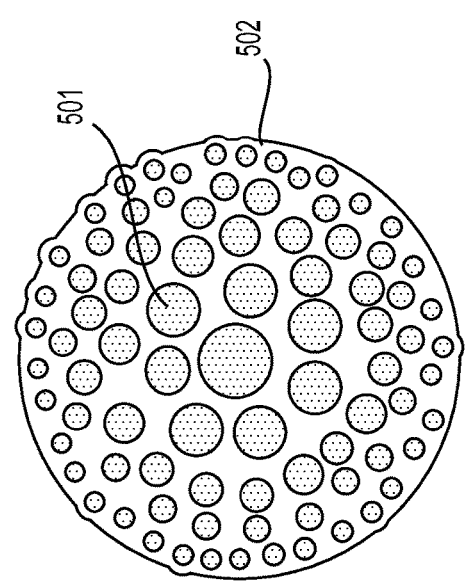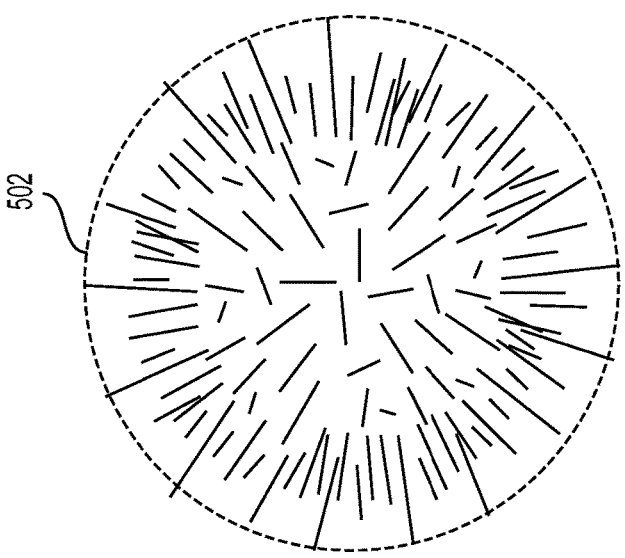
FIG. 5B
FIG. 5C
FIG. 5A

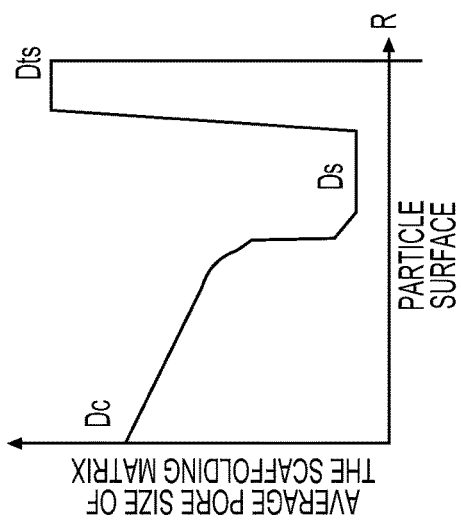
FIG. 6A  FIG. 6B  FIG. 6C

NANOCOMPOSITE BATTERY ELECTRODE PARTICLES WITH CHANGING PROPERTIES

CLAIM OF PRIORITY UNDER 35 U.S.C. § 119

The present application for patent claims the benefit of U.S. Provisional Application No. 62/063,493, entitled "Nanocomposite Battery Electrode Particles with Properties Changing Along their Radii," filed Oct. 14, 2014, which is expressly incorporated herein by reference in its entirety.

BACKGROUND

Field

The present disclosure relates generally to energy storage devices, and more particularly to battery technologies that utilize powder-based electrodes and the like.

Background

Electrochemical energy storage technologies are useful for a broad range of important applications, such as energy efficient industrial equipment, electric and hybrid electric vehicles (including ground vehicles, air vehicles, and ships), the electric grid, and consumer electronics, to name a few. Owing in part to their relatively high energy densities, light weight, and potential for long lifetimes, advanced metal-ion batteries, such as lithium-ion (Li-ion) batteries, now dominate consumer electronics and electric vehicle applications. However, further development and improvement of various types of batteries is needed.

Energy density (energy storage ability per unit volume) is one area for improvement. The majority of rechargeable batteries utilize electrodes comprising powders of battery materials. These powders exhibit electrochemical reactions during battery charging or discharging. Unfortunately, materials that offer high volumetric capacity (high ion-storage ability per unit volume) to such powders often suffer from volume changes during battery operation, which may result in cell degradation. In addition, many such materials additionally suffer from low conductivity (at least during some stage of charge or discharge), which may result in low power performance. For example, in the case of rechargeable metal and metal-ion batteries (such as Li-ion batteries), materials that offer high capacity, such as conversion-type cathode materials (e.g., fluorides, chlorides, bromides, sulfides, sulfur, selenides, selenium, oxides, nitrides, phosphides and hydrides, and others for Li-ion batteries), conversion and alloying-type anode materials (e.g., silicon, germanium, tin, lead, antimony, magnesium, aluminum, their oxides nitrides, phosphides and hydrides, and others for Li-ion batteries) and others, suffer from at least some of such limitations. The volume changes during ion (e.g. metal-ion) insertion/extraction, which may cause mechanical and electrical degradation in the electrodes and (particularly in the case of anode materials for metal-ion batteries) degradation in the solid-electrolyte interphase (SEI) during battery operation. This, in turn, typically leads to cell degradation. Some of these materials additionally suffer from undesirable reactions between the active material and electrolyte (such as dissolution of the active material or the intermediate reaction product in the battery electrolyte). This may also lead to cell degradation.

There remains a need for further improved batteries, components, and related materials and manufacturing processes for use in various battery chemistries, including but not limited to rechargeable Li and Li-ion batteries.

SUMMARY

Embodiments disclosed herein address the above stated needs by providing improved battery components, improved batteries made therefrom, and methods of making and using the same.

Battery electrode compositions and methods of fabrication are provided that utilize composite particles. Each of the composite particles may comprise, for example, a high-capacity active material and a porous, electrically-conductive scaffolding matrix material. The active material may store and release ions during battery operation, and may exhibit (i) a specific capacity of at least 220 mAh/g as a cathode active material or (ii) a specific capacity of at least 400 mAh/g as an anode active material. The active material may be disposed in the pores of the scaffolding matrix material. According to various designs, each composite particle may exhibit at least one material property that changes from the center to the perimeter of the scaffolding matrix material.

BRIEF DESCRIPTION OF THE DRAWINGS

The accompanying drawings are presented to aid in the description of embodiments of the invention and are provided solely for illustration of the embodiments and not limitation thereof.

FIGS. 3A-3D illustrate example profiles of selected mechanical properties of the scaffolding matrix material (of the composite particle compositions) according to certain example embodiments.

FIGS. 5A-5C illustrate example composite particle and scaffolding matrix compositions according to certain example embodiments, where the scaffolding matrix material changes in average pore size along the particle radius from the center (core) to the perimeter.

FIGS. 6A-6C illustrate example profiles of the average pore size within example scaffolding matrix compositions along the radius of the particles, according to certain example embodiments.

DETAILED DESCRIPTION

Figure 1B:
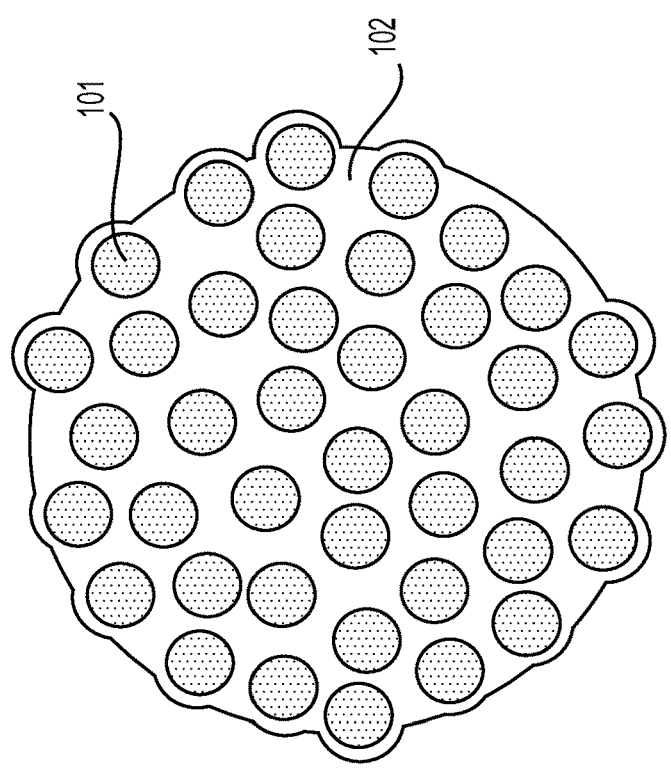
FIGS. 1A-1D illustrate example composite particle compositions according to certain example embodiments, comprising a scaffolding matrix material and high-capacity active material confined within the scaffolding matrix.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

In the description below, several examples are provided in the context of Li-ion batteries because of the current prevalence and popularity of Li-ion technology. However, it will be appreciated that such examples are provided merely to aid in the understanding and illustration of the underlying techniques, and that these techniques may be similarly applied to various other metal-ion batteries (such as Na-ion, Ca-ion, K-ion, Mg-ion, and other metal-ion batteries), various batteries that employ different ions for anodes and cathodes, various batteries with solid electrolytes (including those having two electrolytes—one on the anode and another one on the cathode), various batteries with liquid electrolytes (for example, with organic electrolytes, with aqueous electrolytes of various pH, with various liquid electrolytes based on ionic liquids, or with various liquid electrolytes comprising a mixture of various components, including those described above).

It will be also appreciated that some aspects of the present disclosure may be applicable to other areas as well. One example of such an application is catalysis, such as catalyst particles, where the "active material" may refer to a catalyst particles and a "scaffolding material" may refer to a catalyst support.

The present disclosure provides for advanced composite powder materials for battery electrodes comprising sufficiently electrically-conductive "scaffolding" matrix material having "volume changing," "high capacity," and "high melting point" active material incorporated therein. A suitable fraction of active material in the composite powders ranges from around 20 wt. % to around 99 wt. %. The "high capacity" active material refers to active materials with a specific material capacity in excess of around 400 mAh/g in the case of anode materials and in excess of around 220 mAh/g in the case of cathode materials. The majority of such active materials belong to the so-called "conversion" material family, where the chemical structure of the active material changes during charging and discharging. As used herein, so-called "alloying" type anode materials are considered part of the broader class of "conversion" anode and cathode materials. The "high melting point" active material refers to those active materials that have a melting point in excess of around 250° C. Since conversion-type active materials may exhibit different melting points during different levels of charging or discharging, the "high melting point" discussed above refers to the state of the material during particle synthesis. The "volume changing" active material refers to active materials that experience more than approximately 8 vol. % changes during charging or discharging. The scaffolding matrix material may exhibit substantially (by at least 50%) smaller capacity or substantially (by at least 50%) smaller energy density compared to the high capacity active material, when used within the voltage (potential) range of the composite electrode operation in a cell.

As discussed in more detail below, several advantages over conventional designs may be provided by incorporating "high capacity" and "high melting point" active material into a preferably solid, electrically conductive scaffolding material matrix. For example, deposition of the active material inside a scaffolding matrix (as opposed to surface deposition) helps avoid the often undesirable agglomeration of individual active material particles. A portion of the scaffolding matrix can be left exposed and, therefore, used for the stable attachment of a (polymer) binder or assist in the formation of a stable solid electrolyte interphase (SEI). A more stable particle-binder interface or more stable SEI may lead to more stable performance of the electrode.

In cases when direct contact between the electrolyte and active material is undesirable (for example, in the case of unfavorable reactions, such as (at least) partial dissolution of the active material or electrolyte decomposition, etc.), the outer surface area of the scaffolding matrix can also be used for the deposition of an ionically conductive (and electrolyte solvent impermeable) outer shell, thereby sealing the active material deposited inside the scaffolding matrix and avoiding the often undesirable contact of active material with solvent molecules of the electrolyte.

Similarly, in alternative configurations when direct contact between the electrolyte and active material is undesirable (for example, such as in conversion or alloying-type high capacity electrode materials for use in Li-ion batteries), the scaffolding material may completely encapsulate the active material and prevent its direct contact with the electrolyte. In this case, it may be advantageous for the scaffolding material to possess both sufficient ionic and sufficient electrical conductivities to permit reasonably fast (for a given application) charging and discharging. In some configurations, it may be favorable for the scaffolding material to additionally store charge (ions) and be "active," while exhibiting small volume changes (preferably less than approximately 8 vol. %) during charging and discharging.

For cases where the active material undergoes further expansion during cell operation from the state of the material during particle synthesis, it may be advantageous to provide sufficient pore volume within the "scaffolding material-active material" composite to accommodate from around 20 vol. % to around 100 vol. % of such a volume expansion without causing composite particle fractures. If less than 100% of the needed volume for active material expansion is available within the scaffolding material, it may be advantageous for the scaffolding material to exhibit material properties that are conducive to elastically or plastically accommodate the remaining volume changes without causing composite particle fracture.

It may be similarly advantageous for the scaffolding material to possess a sufficient elastic modulus, mechanical strength, and toughness in order to avoid fractures and failures during the battery cycling-induced volume changes in the high capacity active material.

In cases where the active material does not significantly exceed (e.g., by more than 8 vol. %) its initial volume during each cycle of cell operation (e.g., when the active material already contains the maximum amount of Li and is used in Li-ion batteries), it may be advantageous for it to possess few or no additional pores so that the volumetric capacity of the "scaffolding material-active material" composites is maximized.

The scaffolding matrix may also be used to electrically connect individual active (nano)particles, which can be important for higher utilization of the active particles. Furthermore, the scaffolding matrix may be capable of maintaining such electrical connectivity even in cases when the active particles change dimensions during insertion and extraction of ions (during battery operation, such as during charging and discharging).

It may be advantageous for the scaffolding matrix material (or at least a portion of the scaffolding matrix material) to form a unibody or a single solid particle (for example, where the scaffolding matrix material atoms are linked via chemical bonds) within a single scaffolding matrix material-active material composite particle (as opposed to a weak agglomeration of individual scaffolding matrix material particles within a single composite particle). In this case, the composite may exhibit significantly higher robustness during handling and battery operation (particularly because of the volume changes in the volume-changing active material).

As described above, the scaffolding matrix material can be selected as a porous material. The pores is this matrix can be either completely filled with the high capacity active material (e.g., when no additional space is needed for volume expansion) or partially filled with the high capacity active material (e.g., when additional pore space is needed to accommodate the volume expansion during charge-discharge cycling).

The pores in the scaffolding matrix may either be closed or open (interconnected). When direct contact between the electrolyte and active material is not desired (for example, when it leads to degradation of the active material), the following configurations may be advantageous: (i) most of the pores in the scaffolding matrix material are closed; (ii) several or more interconnected/open pores in the scaffolding matrix material are closed together (in some configurations, all the interconnected pores within a single particle may be enclosed in an electrolyte-impermeable but active ion permeable shell); or (iii) the pores may be plugged with another material, which may be used to isolate (at least a majority of) the active material (infiltrated into the scaffolding matrix material) from direct contact with the electrolyte.

The scaffolding material may be sufficiently permeable to electrolyte ions participating in the charge storage (such as Li ions in the case of a Li-ion battery). In this case, even when either (i) no open (no interconnected) pores exist in the scaffolding matrix material, (ii) the pores are interconnected but not accessible to the electrolyte (e.g., when an additional ion-permeable shell prevents the electrolyte from penetrating into the scaffold or when the pores are plugged with another material), or (iii) the diffusion coefficient of the active material for the active ions participating in the charge storage is low (e.g., less than about $10^{-11}$ $cm^2/S$), it may be important for the ions from the electrolyte to reach all the matrix-encapsulated, high-capacity active material in a time sufficient to maintain reasonable (for a given application) charge and discharge rates. This will determine the minimum sufficient ionic mobility (diffusion coefficient) and ionic conductivity for the scaffolding matrix of the above-described composites. The value of the minimum ionic conductivity of the scaffolding matrix depends on the size of the composite particles, thickness of the scaffolding matrix walls, ionic resistance of the active material/scaffolding matrix interface and other parameters of the system. In most practical cases, it is desirable for the scaffolding matrix to be sufficiently conductive to maintain at least 50% of the maximum discharge capacity of the composite at a discharge rate of "1 C" (which corresponds to the current density capable of discharging the electrode material within 1 hour, if the electrode material provides its full capacity).

When no undesirable reactions between the solvent and the high capacity active material exist, either (i) the walls of the porous ionically conductive scaffolding material may be still permeable to electrolyte solvent molecules (e.g., to provide higher ionic conductivity to the scaffolding matrix and allow for higher rate performance of the cell) or (ii) the pores of the scaffolding matrix may be open (interconnected) so that the ions may propagate to the active material through the open pores filled with electrolyte.

Figure 1A:
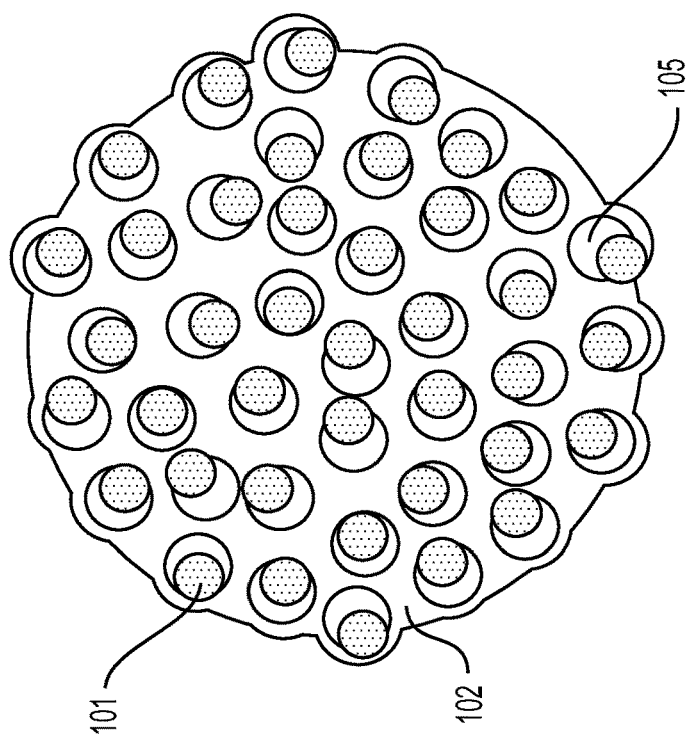
Figure 1D:
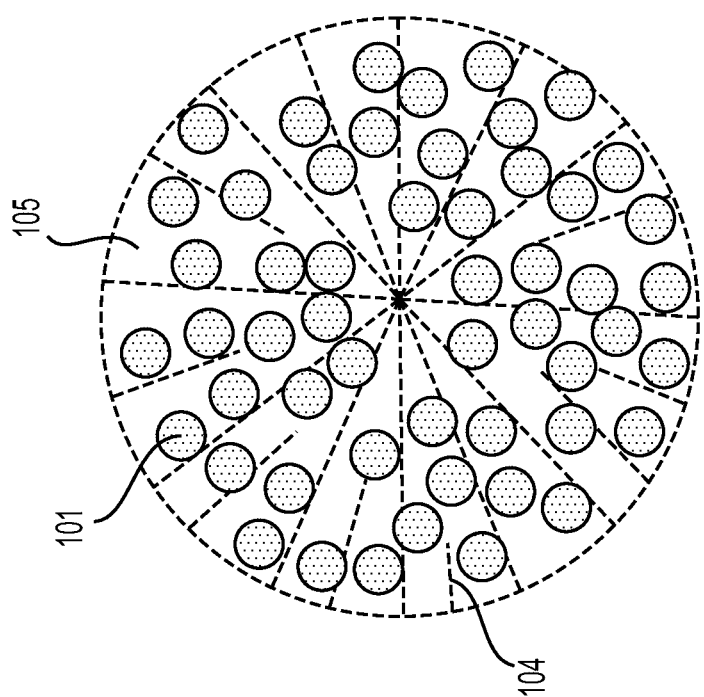
Figure 1C:
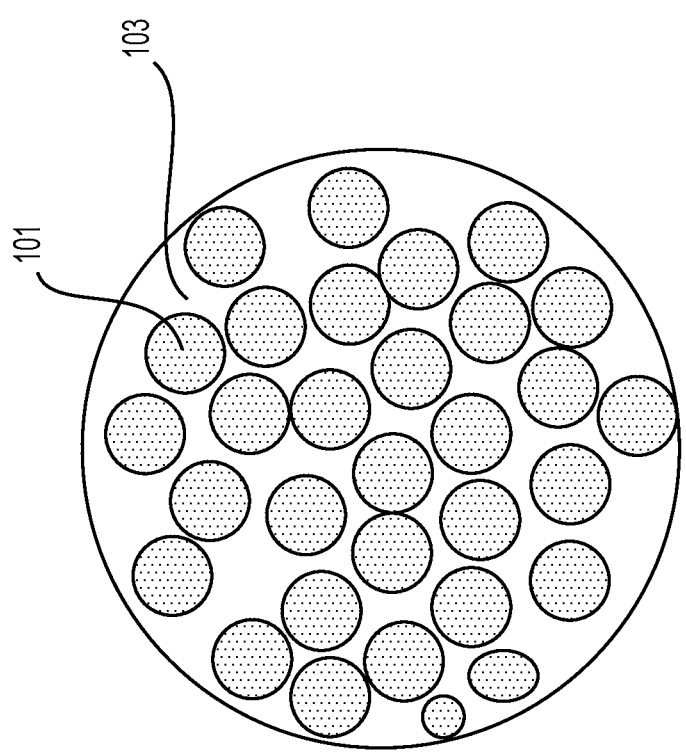

FIGS. 1A-1D illustrate example composite particle compositions according to certain example embodiments, comprising a scaffolding matrix material 102, 103, 104 and high-capacity active material 101 confined within the scaffolding matrix 102, 103, 104. In some designs, the particle compositions may retain certain unfilled space forming pores 105. FIG. 1A illustrates a closed pore scaffolding matrix particle with pores substantially fully filled with the high-capacity active material 101. In this case, the scaffolding matrix material 102 is permeable for active ions (such as Li ions in the case of a Li-ion battery). FIG. 1B illustrates a closed pore scaffolding matrix particle with pores partially filled with the high-capacity active material 101 (and thus leaving some unfilled pores 105). In this case, the scaffolding matrix material 102 is still permeable for active ions (such as Li ions in the case of a Li-ion battery) but additional pore volume is available for expansion of the active material 101 during electrochemical reactions (battery cycling). FIG. 1C illustrates a closed pore scaffolding matrix particle filled with the high-capacity active material 101, but where the scaffolding matrix material 103 is porous and permeable to electrolyte solvent molecules. Porous carbon (e.g., produced by carbonization of a polymer precursor) is an example of such a matrix material. FIG. 1D illustrates an open pore scaffolding matrix particle with the pores 105 partially filled with the high-capacity active material 101. In this case, the pores within the scaffolding matrix material 104 are interconnected.

For Li-ion battery applications, suitable "volume changing," "high capacity," and "high melting point" active materials may include, but are not limited to, the following: (i) conversion-type electrodes, such as various metal fluorides (such as lithium fluorides (e.g., LiF), iron fluorides (FeF$_3$ or FeF$_2$), manganese fluoride MnF$_3$, cobalt fluoride (CoF$_3$ or CoF$_2$), cupper fluoride CuF$_2$, nickel fluoride NiF$_2$, lead fluoride PbF$_2$, bismuth fluorides (BiF$_3$ or BiF$_5$), tin fluoride (SnF$_2$ or SnF$_4$), antimony fluorides (SbF$_3$ or SbF$_5$), cadmium fluoride CdF$_2$, zinc fluoride ZnF$_2$, and other metal fluorides), various metal chalocogenides (such as lithium sulfide Li$_2$S, lithium selenide Li$_2$Se, lithium telluride Li$_2$Te, and others); (ii) various conversion-type metal chlorides (such as lithium chlorides (e.g., LiCl), iron chlorides (FeCl$_3$ or FeCl$_2$), manganese chloride MnCl$_3$, cobalt chloride (CoCl$_3$ or CoCl$_2$), copper chloride CuCl$_2$, nickel chloride NiCl$_2$, lead chloride PbCl$_2$, bismuth chlorides (BiCl$_3$ or BiCl$_5$), tin chlorides (SnCl$_2$ or SnCl$_4$), antimony chlorides (SbCl$_3$ or SbCl$_5$), cadmium chlorides CdCl$_2$, zinc chlorides ZnCl$_2$, and other metal chlorides); (iii) conversion-type metal bromides (such as lithium bromide LiBr), (iv) conversion-type metal iodides (such as lithium iodide LiI), (iv) various conversion-type mixed metal fluorides, mixed metal chlorides, mixed metal bromides, mixed metal iodides, mixed metal halides (mixture of two or more metal halides, such as CuF$_2$ and FeCl$_2$ or CuF$_2$ and FeF$_3$, etc.); (v) various oxihalides; (vi) various other conversion-type electrodes, their combination and mixture (e.g., sulfides, oxides, nitrides, halides, phosphides, hydrides, etc.); (vii) mixtures and combinations of intercalation-type Li-ion battery active materials and conversion-type active materials; and (viii) various high capacity (as previously described) intercalation type active materials with high melting points (as previously discussed). It will be appreciated that these conversion-type active materials may be utilized in both Li-free or partially lithiated or fully lithiated state(s). In some cases, the use of partially or fully lithiated state(s) of active materials may be particularly important for a selected synthesis process (e.g., if only the lithiated state is sufficiently stable for a particular processing/synthesis route). It will be appreciated that partially or fully lithiated conversion-type active materials may be composites. In some examples such composites may comprise metals. For example, if metal halides (e.g., CuF$_2$ or FeF$_3$ or others) are fully lithiated they become a mixture (composite) of a lithium halide (e.g., LiF in the case of metal fluorides) and metal clusters (or nanoparticles) of the corresponding metal fluoride (e.g., Cu, Fe, or a Cu—Fe mixture in the case of CuFe, FeF$_3$, or a CuFe$_2$—FeF$_3$ mixture).

For Li-ion battery applications, other suitable "volume changing," "high capacity," and "high melting point" active materials include, but are not limited to, the following: various alloying-type (where Li electrochemically alloys with an anode during Li insertion) anode materials (which may be considered a version of the conversion type electrode materials), such as (i) silicon Si, germanium Ge, tin Sn, aluminum Al, lead Pb, antimony An, magnesium Mg, and others. It will be appreciated that that these materials may be doped or heavily or "ultra-heavily" doped; in the case of Si, for example, heavily and ultra-heavily doped silicon include silicon doped with a high content of Group III elements, such as boron (B), aluminum (Al), gallium (Ga), indium (In), or thallium (Tl), or a high content of Group V elements, such as nitrogen (N), phosphorus (P), arsenic (As), antimony (Sb), or bismuth (Bi); by "heavily doped" and "ultra-heavily doped," it will be understood that the content of doping atoms is typically in the range of 3,000 parts per million (ppm) to 700,000 ppm, or approximately 0.3% to 70% of the total composition); (ii) various binary Si (or Sn, Ge, Al, Mg, etc.) alloys (or mixtures) with other metals; (iii) various ternary Si (or Sn, Ge, Al, Mg, etc.) alloys (or mixtures) with metals; and (iv) other metals and metal alloys that form alloys with Li. It will be understood that Group IV elements used to form higher capacity anode materials may include Ge, Sn, Pb, and their mixtures (e.g. various alloys or mechanical mixtures), or composites, with the general formula of $Si_a$—$Ge_b$—$Sn_c$—$Pb_d$—$C_e$-$D_f$ where a, b, c, d, e, and f may be zero or non-zero, and where D is a dopant selected from Group III or Group V of the periodic table. For binary silicon alloys (or mixtures) with metals, the silicon content may be in the range of approximately 20% to 99.7%. Examples of such alloys (or mixtures) include, but are not limited to: Mg—Si, Al—Si, Ca—Si, Sc—Si, Ti—Si, V—Si, Cr—Si, Mn—Si, Fe—Si, Co—Si, Ni—Si, Cu—Si, Zn—Si, Sr—Si, Y—Si, Zr, —Si, Nb—Si, Mo—Si, Tc—Si, Ru—Si, Rh—Si, Pd—Si, Ag—Si, Cd—Si, Ba—Si, Hf—Si, Ta—Si, and W—Si. Such binary alloys may be additionally doped (or heavily doped) with Group III and Group V elements. Alternatively, other Group IV elements may be used instead of silicon to form similar alloys or mixtures with metals. A combination of various Group IV elements may also be used to form such alloys or mixtures with metals. For ternary silicon alloys (or mixtures) with metals, the silicon content may also be in the range of approximately 20% to 99.7%. Such ternary alloys may be doped (or heavily doped) with Group III and Group V elements. Other Group IV elements may also be used instead of silicon to form such alloys or mixtures with metals. A combination of various Group IV elements may also be used to form such alloys or mixtures with metals. Examples of other metals and metal alloys that form alloys with lithium include, but are not limited to, Mg, Al, Ga, In, Ag, Zn, Cd, etc., as well as various combinations formed from these metals, their oxides, etc.

It will be appreciated that these alloying-type active materials may be utilized in both Li-free or partially lithiated or fully lithiated states.

For other metal-ion (non-Li) battery applications, suitable "volume changing," "high capacity," and "high melting point" active materials may include materials similar to those described above, but where other metal ions are used instead of Li. For example, for a Na-ion battery, LiBr may be replaced with NaBr as a high capacity, volume changing, high melting point active material.

For other types of batteries, other "volume changing," "high capacity," and "high melting point" materials may be used. For example, for an alkaline battery, various metals (such as Fe, Zn, Cd, Ni, or others), various metal oxides, various metal hydrides, various metal hydroxides and oxi-hydroxides, or other known conversion-type active electrode materials may be used as a high capacity anode or cathode material.

In some configurations (for example, in the case of various aqueous batteries), some aspects of the design (such as the type of composite particles, type of scaffolding matrix, protection of the active material from electrolyte, enhancements to mechanical stability or electrical conductivity of the powders, the electrode or powder manufacturing process, and others) may be used with active materials that do not experience phase changes or do not possess very high capacity (e.g., have specific capacities of only 90-220 mAh/g for the cathode or 90-440 mAh/g for the anode)

As previously discussed, advantageous properties of a suitable scaffolding matrix material include: high electrical conductivity (such as above $10^{-2}$ S/m), good mechanical strength and modulus of toughness, and in some cases (as previously discussed) a high diffusion coefficient for ion transport (such as above $10^{-9}$ cm$^2$/s). It may be particularly advantageous for the electrical conductivity to be above 0.1 mS/cm (=0.01 mS/mm=0.01 S/m). It may be particularly advantageous for the flexural and compressive strength of the scaffolding matrix material to be above 1 kPa. The specifications for the thermal properties of the scaffolding matrix may generally depend on the composite synthesis procedure. If either the active material infiltration into the scaffolding matrix or post-treatment or sealing of some of the pores or other necessary or preferred fabrication steps takes place at elevated temperatures, for example, then the scaffolding matrix should be sufficiently thermally stable to withstand such a treatment.

Several general classes of scaffolding matrix material have been found to be suitable. These include, but are not limited to, materials comprising: (i) carbon (including doped carbon); (ii) conductive polymers (particularly those that remain conductive during cell operation); and (iii) sufficiently conductive ceramic materials (such as metal oxides, including mixed or complex metal oxides, phosphates, titanates, silicates, etc.). In some cases, metals may also be suitable as a scaffolding matrix. However, they commonly suffer from corrosion, slow ion transport and limited surface area. Therefore, their use may be limited to certain applications.

For composite electrode materials for Li-ion batteries having an average potential below around 4.0 V vs. Li/Li+ during cycling, carbon as a scaffolding matrix may be particularly attractive due to carbon's high electrical conductivity (mainly, sp$^2$ bonded carbon, such as in graphene, graphite, nanotubes, activated carbons, carbon fibers, carbon black and other conductive carbon materials), high mobility for Li ions, high strength, low density, and (if needed in some cases) good thermal stability.

Various shapes of the composite particles (composed of scaffolding matrix filled with active material) may be suitable for different designs, including: flake shapes, elliptical or spherical shapes, as well as others, including random shapes. However, the use of essentially elliptical or near spherical (spheroidal) particles may be beneficial because such particles allow for rapid ion transport through the inter-particle spacing within the compacted electrode. Furthermore, in cases when the composite particles contain solvent-impermeable shells, it may be beneficial to maintain a narrow distribution of particle sizes during synthesis and thus control the particle diameter-to-shell thickness ratio in a narrow range. In this case the properties of the particles may be optimized more precisely and higher energy densities may be achieved with similar reliability/cycle life (or better cycle life in cells may be achieved with a similar level of energy density). It may therefore be advantageous to maintain a (D90-D10)/D50 ratio of less than 4 (or even more preferably, less than 3). Once synthesized, particles of mixed sizes may be used in the actual electrode to enhance its packing density and strength (e.g., where larger particles are additionally contacted by several smaller particles, the electrode strength may be increased).

It will be appreciated that the different composite particle structures provided herein can be formed in a variety of ways. Several example methods of fabrication for an active material infused scaffolding matrix are described below. The fabrication techniques allow efficient and controlled incorporation of nanoparticles of electrochemically active high capacity battery materials with high melting points, for example, or with no melting point (when the materials would simply decompose at high temperature), into a porous scaffolding matrix, such as a carbon matrix by way of example.

In one example, active material may be introduced into pre-fabricated porous scaffolding matrix (e.g., carbon) particles via chemical vapor deposition (CVD) or atomic layer deposition (ALD) or other vapor deposition techniques. Porous carbon particles may be fabricated by chemical synthesis or precipitation-driven fabrication, or a combination of chemical and precipitation methods of polymeric precursor particles, their pyrolysis (thermal treatment) and activation (partial oxidation to introduce or increase the volume of interconnected pores). Desired pore sizes and their distribution may be achieved, for example, by a combination of porosity in the polymer precursor and a carbon activation process. Another way to produce porous carbon scaffolds includes synthesis of a large polymer monolith, its carbonization, and mechanical grinding of the carbon monolith into particles of the desired shape. The activation process may involve physical oxidation with oxygen-containing gases (such as $CO_2$, $H_2O$, air, $O_2$, etc.), chemical activation (e.g., with KOH, $KNO_3$, $ZnCl_2$, $Zn(NO_3)_2$, $Zn_3(PO_4)_2$, $H_3PO_4$, or other suitable chemicals), or a combination of these approaches. The activation may be performed during or after the thermal treatment. In order to introduce both micropores and mesopores (which may in some cases be beneficial, as discussed above), carbon activation may be performed at different temperatures (e.g., at about 800 and about 1000° C.) or using different activation agents (e.g., $CO_2$ and $H_2O$). In some cases, it may be beneficial to introduce mesopores into the porous carbon by utilizing a mixture of two polymers or block-copolymers (or carbon yielding polymer mixture with an organic liquid or porogen) within the polymeric precursor particles. In some cases, the organic liquid can be a non-solvent for the polymer or the polymer can be swollen in that liquid. The non-solvent/ solvent nature of the liquid will define the pore sizes and distribution of the pores. One of the polymers can be either removed after synthesis of the polymeric particles by selective extraction or one of the polymers may inherently exhibit low thermal stability or very low carbon yield during carbonization or after activation, or both. In some cases, pores may be introduced into the surface of dense carbon particles (such as synthetic or artificial graphite, mesocarbon microbeads, etc.). In one example, metal or other inorganic nanoparticles may be pre-deposited on the surface of carbon to serve as catalysts for etching or oxidation of pores within the carbon. In another example, extractable, non-carbonizing nanoparticles may be introduced into the precursor (e.g., polymer) particles subjected to carbonizations. In some examples, such nanoparticles may comprise metal salts, metal oxides, or metals. In some applications, such as when metal nanoparticles are used for pore templating at some point of the porous carbon synthesis process, it may be advantageous to use metals that exhibit a melting point in the range from around 100 to around 700° C. It may further be advantageous for this metal not to be flammable upon exposure to air. In, Sn, Cd, Te, and Zn are examples of suitable metals. It may further be advantageous for this metal to exhibit lower toxicity (thus, Cd may be less preferred). In some examples, such metal nanoparticles may be formed upon reduction of the corresponding metal salts (for example, by carbon). In some examples, this reduction process may introduce micropores (e.g., pores smaller than 2 nm) into the carbon material. In addition to metals, metal salts, and metal oxides, other templates may also be used for pore formation. In other examples, a carbon porous scaffold may be made by carbon deposition (CVD for example) on a highly porous scaffold made from inorganic material (with possible etching of the material after carbon deposition). Silica aerogels are one example of such inorganic scaffolds for carbon deposition. In other examples, the porous carbon scaffolding matrix may be an activated carbon produced from natural materials (wood, straw, nut shells, natural polysaccharides, coal, sucrose, petroleum coke, pitch, peat, and lignite, to name a few). In other examples, the porous carbon scaffolding matrix may be an activated carbon produced by hydrothermal carbonization and subsequent annealing and activation of organic precursors. In yet other examples, the porous carbon scaffolding matrix may be a porous carbon produced from inorganic precursors (such as carbides). An example of such a porous carbon synthesis involves chlorination of carbides. A variety of other known methods for the formation of porous carbons may also be utilized.

According to another example method, active particles may be introduced into a pre-fabricated porous carbon matrix via vapor infiltration and/or capillary condensation. This approach may be particularly attractive for materials that have high vapor pressures (e.g., greater than about 0.1 Pa) at moderately high temperatures (e.g., less than about 1000° C.).

According to another example method, active particles may be introduced by: (i) dissolving active particles or active particle precursors in a solvent; (ii) infiltration of the solution into the pores of a pre-fabricated porous carbon matrix under normal pressure, at increased pressure, or under vacuum; (iii) evaporation of the solvent; and (iv) (if needed) transformation of the precursor into the active particles (for example, upon heating or upon reaction with a reactive gas or liquid). In some cases, some of the above steps may be repeated to increase the total amount of the introduced nanoparticles of active material into the porous carbon matrix.

According to another example method, active particles may be introduced by: (i) dissolving active particles or active particle precursors in a solvent; (ii) infiltration of the solution into the pores of a pre-fabricated porous carbon matrix under normal pressure, at increased pressure, or under vacuum; (iii) heterogeneous precipitation of nanoparticles on the inner carbon surface from the solution by, for example, adding a non-solvent, changing the ionic strength or the pH of the solution, or changing the temperature/pressure of the system; and (iv) (if needed) transformation of the precursor into the active particles. In some cases, some of the above steps may be repeated or combined to increase the total amount of the introduced nanoparticles of active material into the porous carbon matrix.

According to another example method, active particles may be introduced by infiltration of nanoparticles of active materials into the pores of pre-formed porous carbon using a suspension infiltration method under normal pressure, at increased pressures, or under vacuum.

According to another example method: (i) active nanoparticles may first be adsorbed onto the surface of the nanoparticles of a polymeric precursor for carbon formation (e.g., by introduction of the opposite charge on the surface of the active nanoparticles and the surface of the polymer precursor nanoparticles); (ii) thermal treatment that induces carbonization of the polymer precursor and the formation of the nanocomposite comprising active nanoparticles, carbon, and nanopores; and (iii) (optional) activation to increase the volume of pores. In another example, after the nanoparticle deposition, the composite polymer particles may be covered with another carbon-forming or non-carbon forming polymer layer by the electrostatic adsorption of a polymer having opposite surface charge than that of the particles.

According to another example method: (i) active nanoparticles and polymer precursor nanoparticles may be coagulated heterogeneously from a solution/suspension to form larger composite-precursor particles; (ii) thermal annealing (or "carbonization" in cases when a carbon matrix is to be produced) to form the nanocomposite with nanoparticles uniformly distributed within carbon and pores; and (iii) optional activation to increase the volume of pores.

According to another example method, the following may be performed: (i) active nanoparticles may first be dispersed in a monomer or polymer solution; (ii) the produced suspension may be emulsified (e.g., in water) to produce spherical nanoparticle-polymer colloids in water; (iii) the monomer in the colloids may be polymerized (or solvent may be extracted from a polymer solution) to produce the spherical composite particles composed of active nanoparticles and a polymer; (iv) upon water evaporation the composite particles may be carbonized; and (v) the produced carbon-active nanoparticle composite may (optionally) be activated to increase the volume of pores. In another example, polymerization may be conducted in a non-aqueous solvent for a monomer, which is a non-solvent for the polymer being synthesized. During the polymerization, the polymer particles may be formed by a precipitation mechanism. In the course of the precipitation, polymerization of the active nanoparticles becomes captured inside the polymer particles. Upon particle separation, the composite particles may be carbonized.

According to another example method, the following may be performed: (i) water with active particle precursors may be emulsified in a monomer solution; (ii) the produced mixture may be emulsified in water again to produce colloids of the monomer solution (inside of which there are colloids of active particle precursor); (iii) the monomer may be polymerized producing near-spherical polymer particles containing the distribution of precursors of active particles; (iv) the produced emulsion may be dried, calcinated/carbonized to produce porous carbon particles with incorporated nanoparticles of active material; and (v) the produced carbon-active nanoparticle composite may (optionally) be activated to increase the volume of pores. An analogous approach can be realized in a non-aqueous medium as mentioned above.

According to another example method, the following may be performed: (i) an active particle precursor may be dissolved in an organic solvent along with a suitable carbon forming polymer; (ii) the homogeneous solution may be mixed with an excess of a non-solvent for the particle precursor and the polymer, and composite particles may be formed by precipitation; and (iii) the produced particles may be dried, calcinated/carbonized to produce porous carbon particles with incorporated nanoparticles of active material. In another example, the precipitation may be conducted via changing ionic strength or pH of the solution, or changing temperature/pressure of the system.

According to another example method, scaffolding matrix material-active material composite particles may be produced by: (i) dissolving active particles or active particle precursors in a solvent; (ii) dissolving scaffolding matrix material or scaffolding matrix material precursor in the same solvent as that used to dissolve active material; (iii) mixing the two solutions together; (iv) evaporation of the solvent and thus forming precipitates of the active material (or active material precursor) within a scaffolding matrix (or within a matrix of the scaffolding material precursor); and (v) (if needed) transformation of the active material precursor into the active particles and/or transformation of the scaffolding material precursor into the scaffolding material (e.g., by thermal treatment in an inert gas or vacuum). In this example, the scaffolding matrix-active material precursor solution can be (a) converted into particles (often particles agglomerated into large granules) by evaporation of the joint solvent, with subsequent (optional) mechanical milling yielding composite particles of the desired size; or (b) spray-dried to form particles with the desired size followed by (if needed) transformation of the active material precursor into the active particles and/or transformation of the scaffolding material precursor into the scaffolding material (e.g., by thermal treatment in an inert gas or vacuum).

In addition to the use of the above methods for the preparation of carbon-based scaffolding matrix material or carbon-based scaffolding matrix material-active material composites, other (non-carbon or non-pure carbon) scaffolding matrix materials or scaffolding matrix material-active material composites may be prepared by similar techniques or straightforward deviations from such techniques.

Returning to the particle composition discussion above, in some designs, the composition of the scaffolding matrix material may change from the center to the perimeter of the composite particle. In one example, the scaffolding matrix may comprise carbon (C), oxygen (O), and hydrogen (H) atoms. In one example, it may be advantageous for the composite particle to exhibit a gradient in the relative content of C, O and H atoms. In one example, the core of the matrix may contain more O and H (and thus, for example, exhibit higher affinity to some of the active material, while retaining sufficient flexibility to accommodate the volume changes within the active material during cycling), while the outer region near the perimeter of the particle mostly comprises C atoms to achieve higher electrical conductivity and a higher elastic modulus. In another example of a similar scaffolding matrix, the outermost layer of the scaffold (near the perimeter of the particle) may have a composition that binds well with the binder material or (in cases when decomposition of the electrolyte takes place with the formation of solid decomposition products—for example, in the case of Li-ion battery electrodes) binding well with the SEI, thus improving the stability of the composite electrodes during cycling. The outer most layer of the matrix may also have a composition that has a relatively poor adhesion (or high interfacial energy, poor wetting, or longer nucleation time) to the high capacity active material so that less volume-changing active material is located near the perimeter of the particle after its synthesis and thus more stable such particles may be produced. As discussed above, in some designs, it may be advantageous for the composite particles to be isolated from the electrolyte by an ionically conductive shell (so that, for example, unfavorable interactions between the active material and the electrolyte are minimized or avoided). By forming a gradient in the scaffolding matrix composition, the deposition of such a shell layer may be facilitated, even in cases when the pores in the scaffolding matrix are not completely filled with active material and some pores remain empty to accommodate the volume changes in the active material during cycling. In one example, the outer most layer of the matrix may have relatively strong interactions with/adhesion (low interfacial energy) to the active ion permeable shell material (or, when a vapor deposition technique is used for the active material infiltration, exhibit a high sticking coefficient for the active material or active material precursor and small nucleation time), thus allowing the shell material to seal the outer pores within a short distance (for example, within less than 10% of the particle diameter) and prevent the above-discussed undesirable direct contact of the active material with the electrolyte solvent.

Figure 2B:
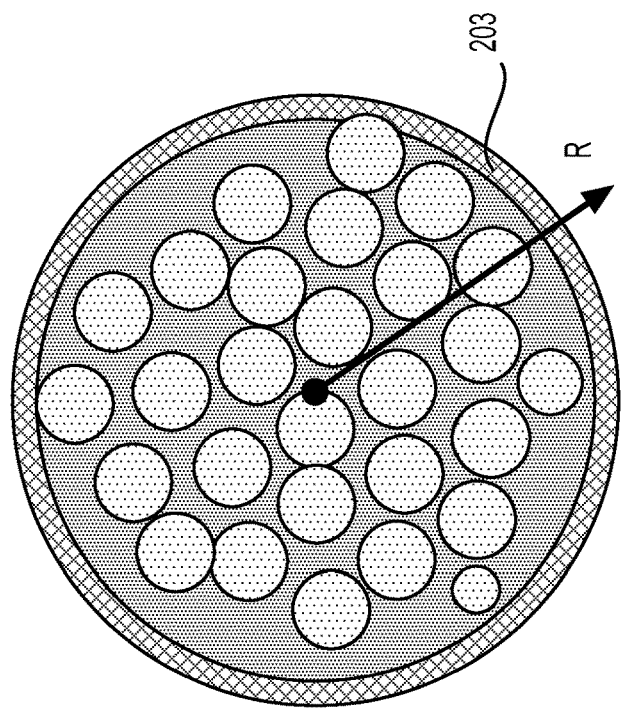
FIGS. 2A-2E illustrate different aspects of example composite particle compositions according to certain example embodiments, comprising a scaffolding matrix material with a gradient composition and active high capacity material confined within the scaffolding matrix.
Figure 2A:
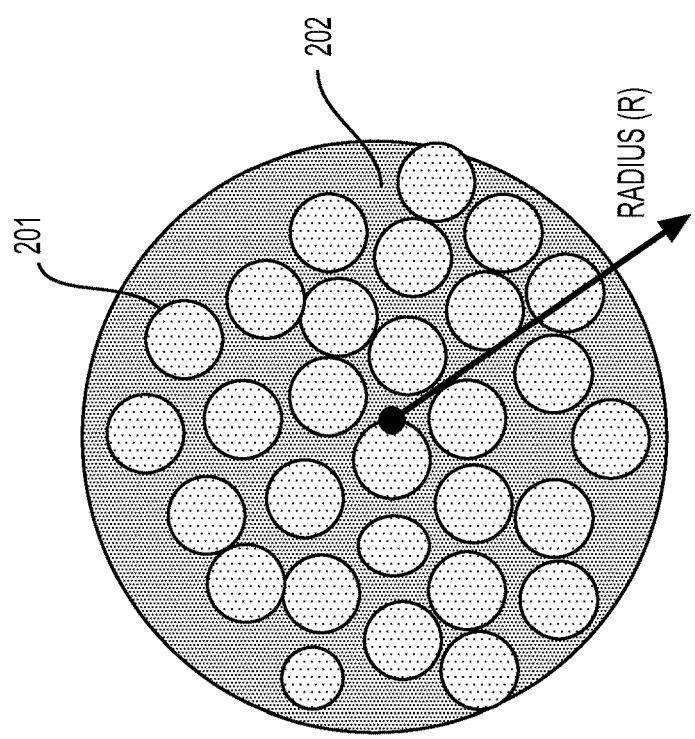
Figure 2C:
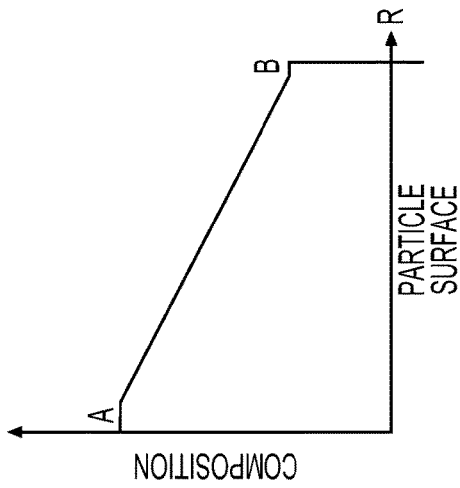
Figure 2D:
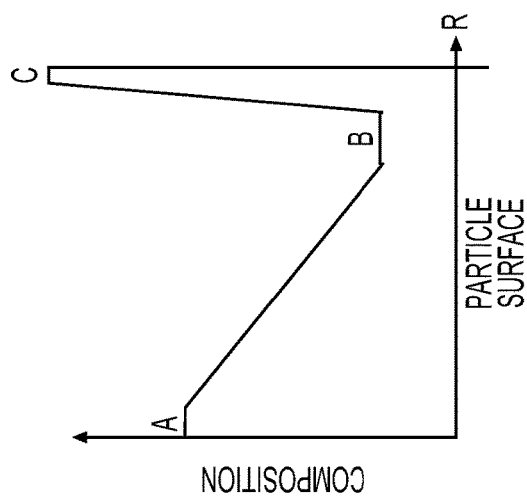
Figure 2E:
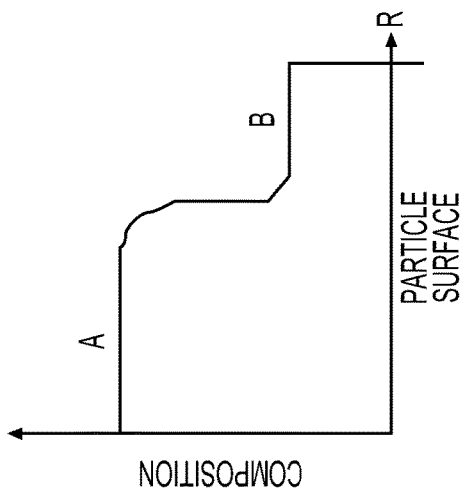

FIGS. 2A-2E illustrate different aspects of example composite particle compositions according to certain example embodiments, comprising a scaffolding matrix material 202 with a gradient composition and active high capacity material 201 confined within the scaffolding matrix 202. FIGS. 2A-2B illustrate such particles without (FIG. 2A) and with (FIG. 2B) an active ion permeable shell 203. FIGS. 2C-2E illustrate example compositional profiles according to certain example embodiments, where in FIGS. 2C and 2D the composition changes from the center (core) of the particle (region "A") towards the perimeter of the particles (region "B") and where in FIG. 2E the top surface layer (region "C") has a still different composition (e.g., in order to assist in the formation of the particle shown in FIG. 2B or in order to improve electrode or particle properties when used in a battery cell).

For some designs, the mechanical properties of the scaffolding matrix material may change from the center of a composite particle to the perimeter of the composite particle. For example, near the center of the particle the scaffolding matrix material may exhibit lower elastic modulus or lower hardness so that the volume expansion of the high capacity material during cycling is easier to accommodate in the center of the particle. At the same time, for example, near the perimeter of the particle the scaffolding matrix material may exhibit higher elastic modulus and higher strength so that the composite particles may have an ability to exhibit small volume changes (which may help retain shape and size) in spite of the significant volume changes within the active material during cycling (which may, for example, be accommodated by the pores and deformable portion of the matrix material).

FIGS. 3A-3D illustrate example profiles of selected mechanical properties of the scaffolding matrix material (of the composite particle compositions) according to certain example embodiments. FIGS. 3A and 3B show example profiles of the average hardness ("H") changes of the scaffolding matrix material along the radius of the composite particle from the core ("Hc") to the surface ("Hs"). FIGS. 3C and 3D show example profiles of the average elastic modulus ("E") of the scaffolding matrix material along the radius of the composite particle from the core ("Ec") to the surface ("Es") to the top surface ("Ets").

For some designs, the concentration of defects or the degree of disorder within the scaffolding matrix material may change from the center to the perimeter of the particles. For example, near the center of the particle the scaffolding matrix material may exhibit a higher concentration of defects or certain functional groups, which, in turn, may serve as nucleation sites for further infiltration with the active material (deposition of the active material within the scaffold material pores). Thus, a higher concentration of nucleation-inducing defects may result in higher content of the volume changing active material near the center of the particle, which, in turn, may result in lower overall volume changes of the composite particle and better electrode stability (cycle life) for a given active material weight fraction. Near the perimeter of the particle, the scaffolding matrix material may exhibit a lower concentration of nucleation-inducing defects. If the ion-permeable shell material (discussed above) is similar to the material used in the scaffolding matrix (for example, when both are made of mostly carbon atoms), then a lower concentration of nucleation-inducing defects in the matrix near the perimeter of the particle may assist in the rapid deposition of such a shell layer (for example, to seal the outer pores within a short distance, e.g., within less than 10% of the particle diameter) and prevent the above-discussed undesirable direct contact of the active material with the electrolyte solvent. This is because in cases of a homo-epitaxial deposition (as opposed to hetero-epitaxial deposition), the reduced concentration of defects on the substrate results in a faster growth and a higher quality (fewer vacancies, holes, etc.) of the deposited layer. Thus, even in cases when the pores in the scaffolding matrix are not completely filled with active material (e.g., when some pores remain empty to accommodate volume changes in the active material during cycling), sealing the pores within the thin surface layer of the scaffolding matrix-active material composite particle may largely prevent undesirable solvent-active material interaction, while retaining intact a large volume of pores (to accommodate volume changes of the active material).

In some designs, the concentration of certain functional groups within the scaffolding matrix material may change from the center to the perimeter of the particles. For functional groups that serve as nucleation sites for active material deposition, a higher concentration in the center of the scaffolding matrix material particles may be advantageous for achieving a higher content of the volume changing active material near the center of the final composite particles. For functional groups that, in contrast, prevent the nucleation of the active material in the pores of the scaffolding matrix material, a higher concentration in the perimeter of the scaffolding matrix material may similarly result in a higher concentration of active material in the center of the scaffolding matrix material particles because the nucleation in the perimeter may be delayed.

In some configurations, certain functional groups within the scaffolding matrix material may disappear or become undetectable after the deposition of the active material or other treatments on the composite particles (for example, heat treatment or a deposition of another material, such as a sealing shell material). Therefore, the gradient in the concentration of certain functional groups may be primarily important during synthesis and may constitute an innovative synthesis method step to introduce a gradient in the concentration of the active material within scaffolding matrix-active material composite particles or other suitable gradients into the composite particles.

Figure 4A:
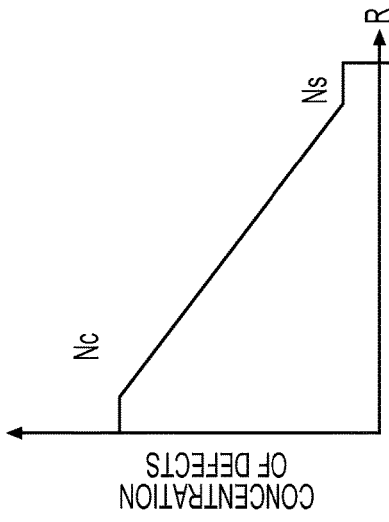
FIGS. 4A-4D illustrate example profiles of the average concentration of defects or functional groups of the scaffolding matrix material along the radius of composite particles according to certain example embodiments.
Figure 4B:
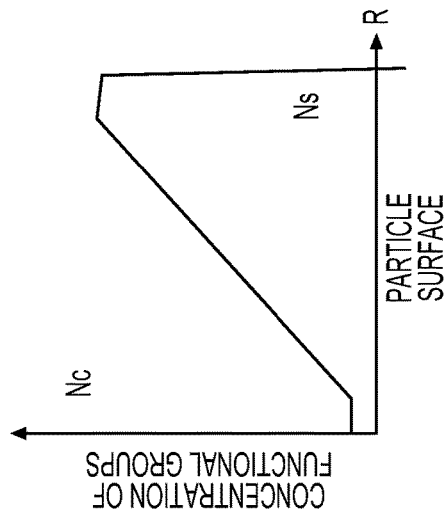
Figure 4C:
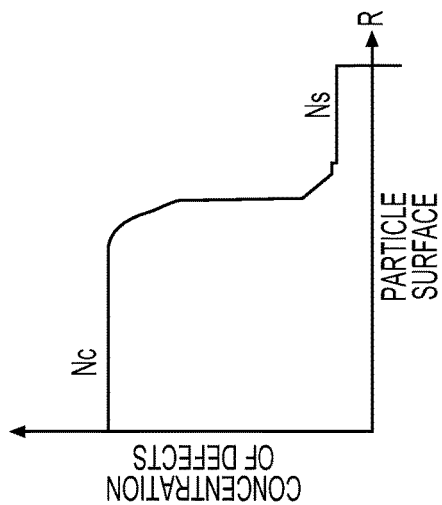
Figure 4D:
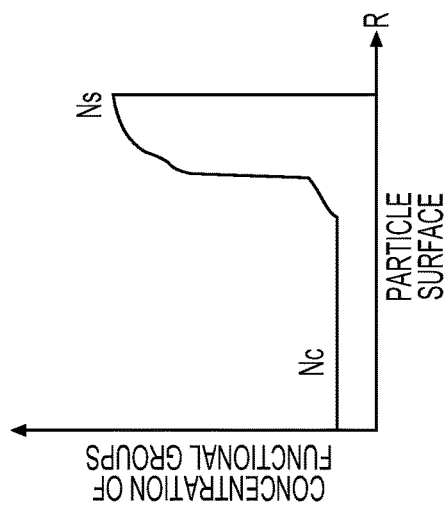

FIGS. 4A-4D illustrate example profiles of the average concentration of defects or functional groups of the scaffolding matrix material along the radius of composite particles according to certain example embodiments. FIGS. 4A and 4B show example profiles of the defect concentration ("N") changes of the scaffolding matrix material along the radius of the composite particle from the core ("Nc") to the surface ("Ns"). FIGS. 4C and 4D show example profiles of the average functional group concentration ("N") of the scaffolding matrix material along the radius of the composite particle from the core ("Nc") to the surface ("Ns").

For some designs, the average spacing between scaffold pores or size of pores (which may be completely or partially filled with the "volume changing," "high capacity," and "high melting point" active material) of the scaffolding matrix material changes from the center of a composite particle to the perimeter of the composite particle. In one example, near the core of the composite particle the scaffolding matrix material may exhibit lager pores available for filling with active material. This may lead to a larger size of the active particles and, in some case, to a larger portion of the high capacity active material near the center of the particles. This particle architecture has been found to improve particle and electrode stability during cycling. In cases when it may be desirable to seal the remaining scaffold pores (and most of the active material dispersed within the pores) with a protective ion-permeable shell material layer (as previously described), smaller pores near the perimeter of the particles may assist in doing so within a short (e.g., less than 10% of the particle diameter) distance. As previously discussed, sealing the pores within the thin surface layer of the (scaffolding matrix-active material) composite particle largely prevents undesirable solvent-active material interaction, while retaining intact a large volume of the pores (to accommodate volume changes of the active material).

In another example, the outer-most layer of the active material may exhibit the largest pores. These large pores may remain mostly empty with respect to the active material (or, if needed, with respect to the sealing shell material) and potentially serve multiple purposes: (i) prevent sintering (gluing) particles together during/after shell deposition (if such shell(s) are deposited); (ii) increase the particle roughness and improve the strength of the particle-binder bonding, the particle-particle bonding, or the particle-SEI bonding (all of which typically improve the cycle stability and other performance characteristics of electrodes made of such composites); (iii) electrically connect the composite particles within the electrode (if the scaffolding matrix material is electrically conductive); and (iv) serve to uniformly separate particles from each other in an electrode (this may be particularly useful for stress minimization within an electrode when particles expand during the first and subsequent cycles, and may be even more particularly important when the electrode capacity loading is in excess of approximately 2 mAh/cm$^2$ and when the electrode active material expands by more than approximately 8 vol. %); to name a few.

For some designs, the average pore volume of the scaffolding matrix (which may be completely or partially filled with the "volume changing," "high capacity," and "high melting point" active material) may change from the center of a composite particle to the perimeter of the composite particle.

FIGS. 5A-5C illustrate example composite particle and scaffolding matrix compositions according to certain example embodiments, where the scaffolding matrix material 502 changes in average pore size along the particle radius from the center (core) to the perimeter. FIG. 5A illustrates a composite particle with, for example, a scaffolding matrix 502 having closed pores filled with high capacity active material 501, where the scaffold pore size reduces from the center to the perimeter of the particle. FIG. 5B illustrates, in relevant part, only the scaffolding matrix 502 (of the composite particle) having, for example, open interconnected pores 503, where the pore size reduces from the center to the perimeter of the particles. FIG. 5C illustrates, in relevant part, only the scaffolding matrix 502 (of the composite particle) having, for example, open interconnected pores 503, where the pore size initially reduces from the center to an area closer to the surface of the particle and then increases again at the surface (perimeter) of the particle, thus forming a "buried layer" having the smallest pore size.

In some designs, the fraction of the "surface layer" or the fraction of the "buried layer" may range from around 1 to around 50 vol. % of the total volume of the particle.

The thickness of the layer of the scaffolding matrix with small pores (such as the "surface layer" or "buried layer") may vary depending on the chemistry and application of the composite particles. However, a thickness in the range from 2 nm to 500 nm has been found to work well in many applications.

FIGS. 6A-6C illustrate example profiles of the average pore size within example scaffolding matrix compositions along the radius of the particles, according to certain example embodiments. FIGS. 6A and 6B illustrate example profiles of the average pore size of a scaffolding matrix with smaller pore sizes closer to the perimeter of the particle. The suitable pore size ("D") distribution may depend on the particular chemistry of active material and the ion mobility within a composite, but typically the suitable average pore size in the center of the particles ("Dc") may range from 2 to 800 nm, while the suitable average pore size in the surface layer ("Ds") may range from 0.3 to 100 nm. In some embodiments, it may be advantageous for Dc to be at least twice as large as Ds. FIG. 6C illustrates an example profile of the average pore size of the scaffolding matrix, where the very top surface layer of the scaffolding matrix has larger pores compared to the "buried small pore layer" (which may be sealed with a shell material in cases when the pores of the scaffolding matrix are interconnected and when the active material does not completely fill the pores). The average pore size at the top surface layer of the particles ("Dts") may range, for example, from around 1.5 to 50 nm, which has been found to work well in many applications.

Figure 7B:
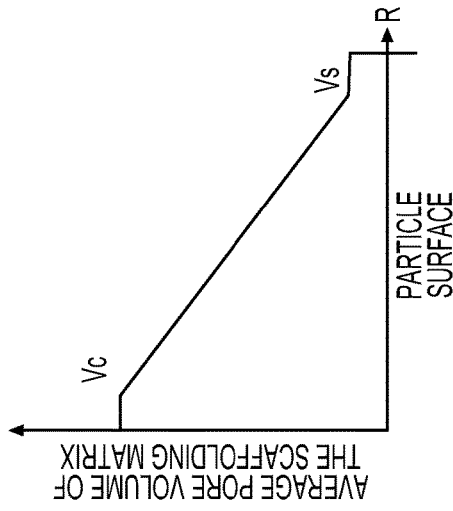
FIGS. 7A-7C illustrate example profiles of the average pore volume within example scaffolding matrix compositions along the radius of the particles, according to certain example embodiments.
Figure 7C:
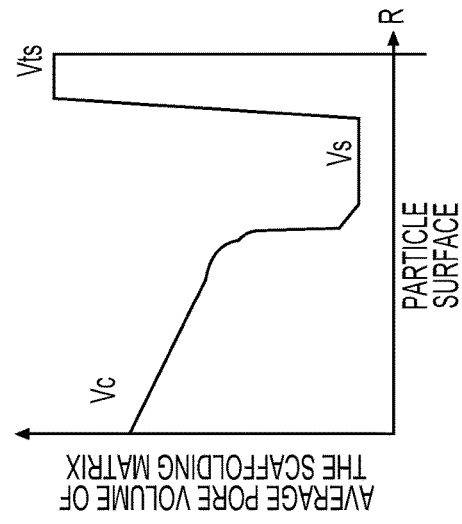
Figure 7A:
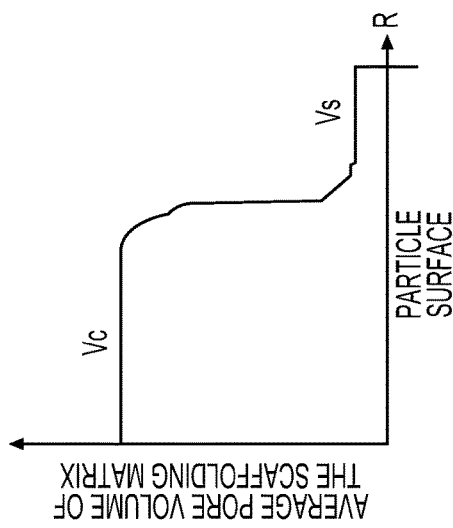

FIGS. 7A-7C illustrate example profiles of the average pore volume within example scaffolding matrix compositions along the radius of the particles, according to certain example embodiments. FIGS. 7A and B illustrate example profiles of the average pore volume of the scaffolding matrix with smaller pore volumes closer to the perimeter of the particle. The suitable pore volume ("V") distribution may depend on the particular chemistry of the active material (and the related volume expansion) and the ion mobility within a composite, but typically the suitable average pore volume of the scaffold in the center of the particles ("Vc") may range from around 0.2 to around 10 cc/g, which has been found to work well, while the suitable average pore volume in the surface layer ("Vs") may range from 0.01 to 5 cc/g, which has also been found to work well in some applications. A pore volume in the center of the particles smaller than 0.2 cc/g may lead to an undesirable reduction in the volumetric capacity of the composite because it may not permit a sufficient amount of the volume changing active material to be placed into these pores. In some embodiments, it may be advantageous for Vc to be at least twice as larger as Vs. FIG. 7C illustrates an example profile of the average pore volume of the scaffolding matrix, where the very top surface layer of the scaffolding matrix has more pores (larger pore volume) compared to the "buried layer with smaller pore volume" (which may be sealed with a shell material in cases when the pores of the scaffolding matrix are interconnected and when the active material does not completely fill the pores). The average pore volume at the top surface layer of the particles ("Vts") may range from around 0.4 to around 20 cc/g, which has been found to work well in many applications.

For some designs, more than one property of the scaffolding matrix (for example, more than one of the previously discussed properties) may change from the center of a composite particle to the perimeter of the composite particle. In one example embodiment, the scaffolding matrix may exhibit, for example, changes in pore size from the center to the perimeter of the particle and additionally exhibit changes in composition from the center to the perimeter of the particle. This facilitates favorable combinations of properties when scaffold-comprising composite particles are produced and used in batteries.

For some designs, the orientation of scaffolding material pores within a composite particle may change from the center of the particle towards the perimeter of the particle. For example, in the center of the particle, the pores may be oriented either randomly or have some preferred orientation along the radial direction, while near the perimeter (surface) of the particles, the pores (e.g., slit-shaped pores) may be preferentially oriented parallel to the particle surface (and thus perpendicular to the radial direction). Such a variation in the pore orientation may bring multiple benefits. In cases when it may be desirable to seal the internal pores within a thin shell layer, it may be necessary to slow down the transport of shell precursor molecules from the outside of the particles towards the center of the particles. By orienting slit-shaped pores parallel to the surface, the diffusion path for the shell precursor molecules may be efficiently increased. In other words, such a pore orientation near the particle surface increases the tortuosity of the path towards the center of the particle. In cases when such a shell layer is deposited, from a vapor phase, for example, increasing the actual path to the level where it exceeds an average distance of the precursor molecule travel prior to its decomposition (and deposition of the shell material) by, for example, an order of magnitude, allows the internal particle pores to be sealed within a small fraction (e.g., approximately 10%) of the diameter. The layer of the slit-shaped (and, for example, smaller) pores within which the sealing "shell" layer is deposited may be termed a "sealable porous layer." In another example, it may be desirable to have a layer of randomly oriented or radially oriented (and, for example, larger) pores at the surface of the particles outside the "sealable porous layer" discussed above. This porous layer may remain mostly empty from both the active material and from the sealing shell material after their deposition and potentially serve multiple purposes (as previously discussed), including: (i) prevent sintering (gluing) particles together during/after the shell deposition within a "sealable porous layer;" (ii) increase the particle roughness and improve the strength of the particle-binder bonding, the particle-particle bonding, or the particle-SEI bonding; and (iii) electrically connect the composite particles within the electrode (if the porous outer layer is electrically conductive).

Figure 8B:
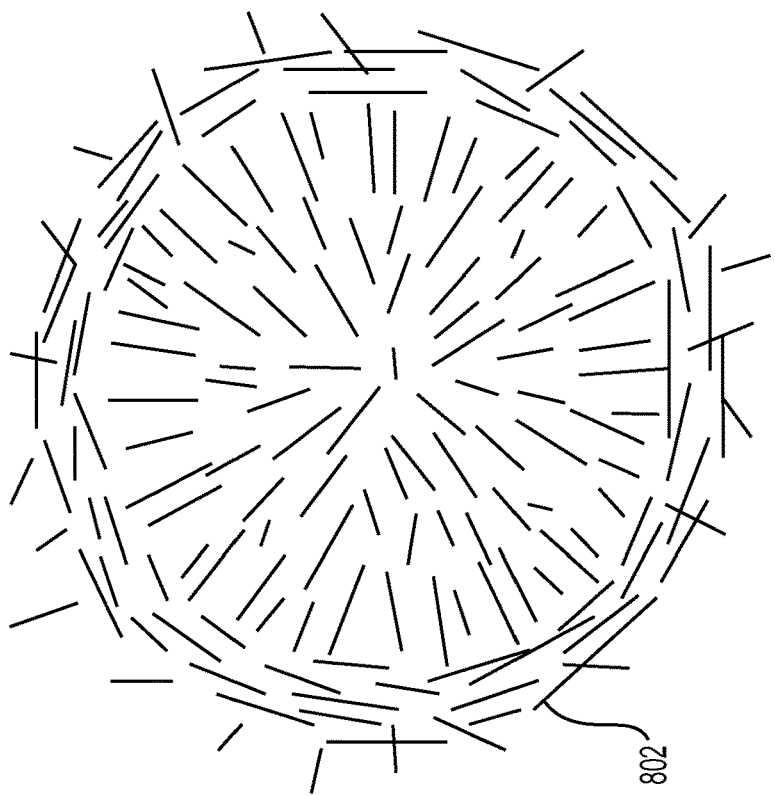
FIGS. 8A-8B illustrate example scaffolding matrix compositions according to certain example embodiments, where the scaffolding matrix material changes pore orientation along the particle radius from the center (core) to the perimeter.
Figure 8A:
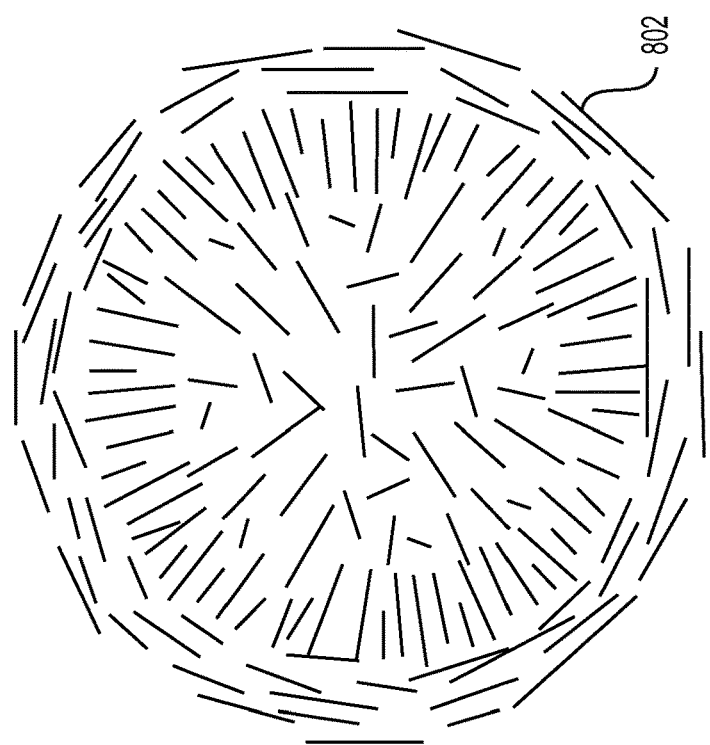

FIGS. 8A-8B illustrate example scaffolding matrix compositions according to certain example embodiments, where the scaffolding matrix material 802 changes in pore orientation along the particle radius from the center (core) to the perimeter. FIG. 8A illustrates a scaffolding matrix 802 (for the composite particle), where the center (core) of the scaffolding matrix particle exhibits mostly randomly oriented (or spherical) pores, which gradually change orientation to become oriented along the radial direction, which, in turn, change orientation to become oriented perpendicular to the radial direction at the top surface of the scaffolding particles. FIG. 8B illustrates a scaffolding matrix 802 (for the composite particle), where the center (core) of the scaffolding matrix particle exhibits pores oriented either along the radial direction or randomly oriented, and where the pores change orientation to become oriented perpendicular to the radial direction near the surface of the scaffolding particle, and where the pores become randomly oriented (or oriented along the radial direction) at the top surface of the particle.

The thickness of the layer of the scaffolding matrix with pores preferentially oriented perpendicular to the radial direction may vary depending on the chemistry and application of the composite particles. However, a thickness in the range from 2 nm to 200 nm has been found to work well in many applications.

In some designs, it may be advantageous for the scaffolding matrix material to be a composite comprising two or more materials. Such materials may provide different (e.g., complementary) functionalities and exhibit differences in electronic, ionic, thermal, chemical, mechanical, or other properties. For example, one of the composite components may exhibit better mechanical strength, while another may exhibit better electrical conductivity or better protection of the active material against undesirable side reactions, or provide more favorable heterogeneous nucleation sites to the active material during composite synthesis or provide another useful function or combination of functions. In some designs, it may be advantageous for at least one component of such a composite scaffolding matrix material to exhibit a gradual change in at least one property (density, electrical conductivity, ionic conductivity, thermal stability, chemical composition, elastic modulus, hardness, or another property) from the center to the perimeter of the scaffolding matrix material.

Various methods may be utilized to produce scaffolding particles with variable composition. According to some suitable methods for composite particle formation, scaffolding matrix particles with gradually changing composition may be produced first and subsequently infiltrated with active material and optionally a protective layer (which may be solid or liquid) and/or a protective shell. According to other suitable methods for composite particle formation, a scaffolding matrix of variable composition may be produced simultaneously with the formation of the composite particles.

A suitable method of scaffolding matrix-comprising composite particle synthesis, where the scaffolding matrix exhibits variable composition along the radius of the particles, may comprise, for example: (i) forming a suspension of nanoparticles of active materials coated with one composition of a precursor of matrix material (such as one type of scaffolding matrix precursor, referred to for generality below as a "type A" scaffolding precursor); (ii) forming another suspension of nanoparticles of active material coated with another composition of a precursor of matrix material (such as another type of scaffolding matrix precursor, referred to for generality below as a "type B" scaffolding precursor); (iii) inducing a gradual aggregation of the type A precursor coated nanoparticles of active material from the nanoparticle suspension; (iv) over time adding suspension of the type B precursor coated nanoparticles of active material from the nanoparticle suspension such that more and more of the type B precursor coated nanoparticles are attached to the outer layer of the aggregate particles; (v) optionally coating the outer layer of the aggregate particles with another (shell layer) of nanoparticles or a layer of the type A, type B, or another ("type C") precursor matrix material; (vi) stabilizing the formed aggregate particles (with the composition of the precursor for the scaffolding matrix gradually changing from the center to the outer perimeter) in a suspension and separating them from the solvent: and (vii) transforming the precursor material of the matrix to the suitable scaffolding matrix material (for example, by a thermal treatment) and thus obtaining aggregate particles with gradually changing (from the center of the particles to the perimeter of the particles) composition of the scaffolding, wherein the scaffolding matrix material of each of the composite aggregate particles structurally supports the active material, electrically interconnects the active material, and assists in minimizing changes in volume of the aggregate particles in spite of changes in volume of the active material.

Another example of a suitable method of scaffolding matrix-comprising composite particle synthesis, where the scaffolding matrix exhibits variable composition along the radius of the particles, may comprise, for example: (i) forming a solution (or suspension of nano-clusters) of one type of a precursor of matrix material (referred to for generality below as a "type A" scaffolding precursor); (ii) forming a solution (or suspension of nano-clusters) of another type of a precursor of matrix material (referred to for generality below as a "type B" scaffolding precursor); (iii) inducing a gradual aggregation of the type A precursor thus causing the growth of the scaffolding matrix precursor particles; (iv) over time adding a solution (or suspension of nanoclusters) of the type B precursor such that more and more of the type B precursor are attached to the outer layer of the aggregate particles changing its composition gradually; (v) optionally coating the outer layer of the aggregate A-B composite precursor particles with another (shell layer) of another ("type C") precursor matrix material; (vi) stabilizing the formed scaffolding matrix precursor aggregate particles (with the composition of the precursor for the scaffolding matrix gradually changing from the center to the outer perimeter) in a suspension and separating them from the solvent; (vii) transforming the precursor material of the matrix to the suitable scaffolding matrix material (for example, by an oxidation and a thermal treatment, which may include a porosity enhancement by activation) and thus obtaining scaffolding matrix particles with gradually changing (from the center of the particles to the perimeter of the particles) composition of the scaffolding; and (viii) filling the scaffolding matrix material with active material, optionally coating the surface of the active material with a protective layer and optionally forming a protective shell to prevent or minimize reaction of the active material with ambient air (during storage or slurry preparation) or with electrolyte (during battery operation).

Yet another example of a suitable method of scaffolding matrix-comprising composite particle synthesis, where the scaffolding matrix exhibits variable composition along the radius of the particles, may comprise, for example: (i) nucleating particles consisting of one type of a precursor of a matrix material (referred to for generality below as a "type A" scaffolding precursor) by a vapor deposition (such as a CVD or ALD) process (in, e.g., a tubular furnace); (ii) introducing a gradually increasing amount of another type of a precursor of matrix material (referred to for generality below as a "type B" scaffolding precursor) along the reactor, causing simultaneous particle growth and a gradual change in particle composition; (iii) optionally coating the outer layer of the aggregate A-B composite precursor particles with another (shell layer) of another ("type C") precursor matrix material; (iv) transforming the precursor material of the matrix to the suitable scaffolding matrix material (for example, by an oxidation and an additional thermal treatment, which may include a porosity enhancement by activation) and thus obtaining scaffolding matrix particles with gradually changing (from the center of the particles to the perimeter of the particles) composition of the scaffolding; (v) filling the scaffolding matrix material with active material, optionally coating the surface of the active material with a protective layer and optionally forming a protective shell to prevent or minimize reaction of the active material with ambient air (during storage or slurry preparation) or with electrolyte (during battery operation). It will be appreciated that filling of the scaffolding matrix material with an active material may also be performed simultaneously with scaffold particle formation by feeding active material precursor into the reactor where scaffold particles are formed.

For the formation of composite particles with tunable (along the radius) scaffolding matrix toughness, elastic modulus, hardness, or other mechanical properties, similar methods can be used as for the fabrication of composite particles with tunable scaffolding matrix composition. In this case though, it may be beneficial for the mechanical properties of interest to vary significantly with varying of the precursor composition.

For the formation of composite particles with a tunable (along the radius) scaffolding matrix microstructure, similar methods can be used as for the fabrication of composite particles with tunable scaffolding matrix composition. In this case though, it may be beneficial for the microstructure of the scaffolding material to vary significantly with varying of the precursor composition (even if the scaffolding matrix material composition is similar—for example, $CH_yO_zN_wS_uP_vCl_tF_s$, where the y, z, w, u, v, t, and s numbers are in the range of approximately 0 to approximately 5 and where these numbers are normalized by the atomic fraction of C in this composition).

Various methods may be utilized to produce scaffolding particles with variable pore shape and pore orientation along the radius of the particles. The methods may vary depending on the desired degree of control and the composition of the scaffolding matrix material. For example, in cases where the scaffolding matrix comprises mostly carbon, the scaffolding matrix particles can be prepared by thermal treatment (annealing in controlled environment with optional oxidation and activation, depending on a particular chemistry) of the organic precursor particles. The pore shape and orientation in the scaffolding matrix particles often depends on the properties and structural orientation of the precursor particles. Thus, by first preparing the precursor particles, where the precursor composition and orientation changes from the core to the surface, scaffolding particles can be produced with variable pore shape and pore orientation along the radius of the particles. Furthermore, the porous carbon scaffold precursor can also be produced by activation of non-porous carbon, produced for example, by CVD. The CVD-deposited carbon (particularly if deposited at low pressures below 50 Torr or at high temperatures above 500° C.) typically exhibits some degree of grain orientation (ordering). When inducing the pores in such a CVD-deposited carbon by activation, pores may be produced with a preferred direction parallel to the original orientation of grains within the CVD carbon. Thus, by (i) first CVD depositing a layer on the surface of carbonized polymer particles and thereby producing a CVD carbon coating with grains oriented mostly parallel to the particle surface and then (ii) activating the CVD-C coated particles (e.g., by physical and chemical activation) carbon scaffolding matrix particles can be produced with pores largely oriented perpendicular to the radial direction (parallel to the surface) within this surface layer of the scaffolding particles. In the bulk of the scaffolding matrix particles, at the same time, the pores may be oriented, for example, randomly.

Various methods may be utilized to produce scaffolding particles with variable pore size (or pore volume) along the radius of the particles. The methods may vary depending on the desired degree of control and the composition of the scaffolding matrix material. For example, in cases where the scaffolding matrix comprises mostly carbon, the scaffolding matrix particles can be prepared by thermal treatment of organic precursor particles, as previously described. The pore size and pore volume in the scaffolding matrix particles typically depends on the properties and structural orientation of the precursor particles (for given thermal treatment conditions). For example, some of the precursor material may induce formation of large pores, some may induce formation of smaller pores, some may nearly completely disappear during the particular thermal treatment, some may induce larger pore volume and some smaller. Thus, by first preparing the scaffold precursor particles, where precursor composition changes from the core to the surface (as previously described), scaffolding particles can be produced with variable pore size and pore volume along the radius of the particles. In another suitable example method, the carbonization yield of the carbon precursor (for example, when suitable polymers are used as carbon precursors) may depend on the oxidation conducted prior to the carbonization (annealing) procedure. By introducing a gradient in the degree of oxidation from the center to the perimeter of the carbon precursor particles (for example, by controlling the time and temperature of the exposure of the precursor particles to a suitable liquid or gaseous oxidizing agent, which may be used to control its diffusion distance from the perimeter/surface of the precursor particles to the center of the precursor particles), one may achieve the desired level of the gradient in the carbon porosity after the carbonization. Additional pore volume may be formed by an additional activation step.

When additional porosity into the carbon particles is introduced by activation of previously formed carbon particles, different rates of activation processes may be used to create a desired pore size distribution. Activation rates can be tuned by varying the chemical nature of the carbon precursors constituting the particles.

For some designs, the composition of the high capacity active material may change from the center to the perimeter of the composite particle. This change in composition provides various advantages when the composite material is used in batteries.

For example, in Li-ion battery materials, various high capacity materials are differentiated in various parameters (which may be important for Li battery operation and cost), such as capacity, cost, volume changes during Li insertion and extraction, average potential for Li insertion and extraction, and reactivity (or solubility) in contact with liquid electrolyte, to name a few. It may be advantageous for the composite particle to have, for example, more of a higher capacity material (that exhibits the largest volume changes) infiltrated into the center of the particle, and have more of another, lower capacity material (that exhibits smaller volume changes) infiltrated into the surface layer of the composite particle. In this case, the overall stability of the particle may be improved. In an illustrative example when metal fluorides are used as a high capacity Li-ion cathode material within a scaffolding matrix, a composite core may be rich, for example, in a higher volume changing (and higher capacity) $FeF_3$, while the surface may be rich, for example, in a lower volume changing (and lower capacity) $FeF_2$. In another example, it may be advantageous to have more of a higher capacity (or higher energy density) (but potentially more reactive with electrolyte) material in the core and have more of a less reactive with electrolyte (or less dissolvable in electrolyte) material near the surface of the composite particle (even if such a material offers lower capacity or lower energy density to the cell). In this case, again, the overall electrode and/or cell stability may be significantly improved. In cases when metal fluorides are used as a high capacity Li-ion cathode material within a scaffolding matrix, a composite core may be rich, for example, in a highly soluble (and higher energy density) $CuF_2$ (or in a Cu—LiF composite if a fully lithiated state of the cupper fluoride is used in the particle synthesis or design), while the surface may be rich, for example, in a significantly less soluble (and lower capacity) $FeF_2$ or Fe—F—O (iron oxy fluoride) (or an Fe—LiF or $FeO_2$—LiF—$Li_2O$ composite if a fully lithiated state of the iron fluoride is used in the particle designs). In yet another example, it may be advantageous (in some applications) to have more of a material that is active at a lower level of discharge in the core of the particle and have more of a material that is active at a higher level of discharge closer to the surface of the composite particle. In this case, during discharge, the volume of the active material in the core of the particles changes first, while the volume of the active material near the particle surface changes significantly only at a higher level of discharge. Since the number of shallow discharge cycles is typically more than deep discharge cycles, the frequency of significant volume changes in the active material near the surface of the composite particles will be smaller and the resulting cell stability higher. In cases when metal fluorides are used as a high capacity Li-ion cathode material within a scaffolding matrix, a composite core may be rich, for example, in $CuF_2$ (which has a higher average potential during its electrochemical reaction with Li) (or in a Cu—LiF composite if a fully lithiated state of the cupper fluoride is used in the particle synthesis or design) while the surface may be rich, for example, in a $BiF_3$ or Bi—O—F (bismuth oxi-fluoride) (which have lower average potential) or their partially or fully lithiated analogs. In some examples, mixing of different active materials (such as metal fluorides or LiF-metal mixtures in the case of fluoride-based active materials for use in rechargeable metal-ion, such as Li-ion, or rechargeable metal, such as Li, batteries) within the composite may be at an atomic level (as in solid solutions or mixture of solid solutions and clustering). In cases when high capacity fluoride-comprising active materials are used, in some examples a gradient in the relative fraction of LiF-to the metal (e.g., Cu or Fe) from the center to the perimeter of the composite particles may be advantageous for applications in batteries. In cases when high capacity Li-ion anode materials are confined within a scaffolding matrix, a composite core may be rich, for example, in Si (which has a relatively low average potential of Li extraction from lithiated silicon) while the surface may be rich, for example, in Si—O (partially oxidized silicon), Sn, Sn—O (partially oxidized tin), Si—Sn—O (partially oxidized silicon-tin alloy), Si—Mg, P (phosphorous), As (arsenic), Bi (bismuth), or other high capacity materials that have relatively higher average Li extraction potential.

Figure 9B:
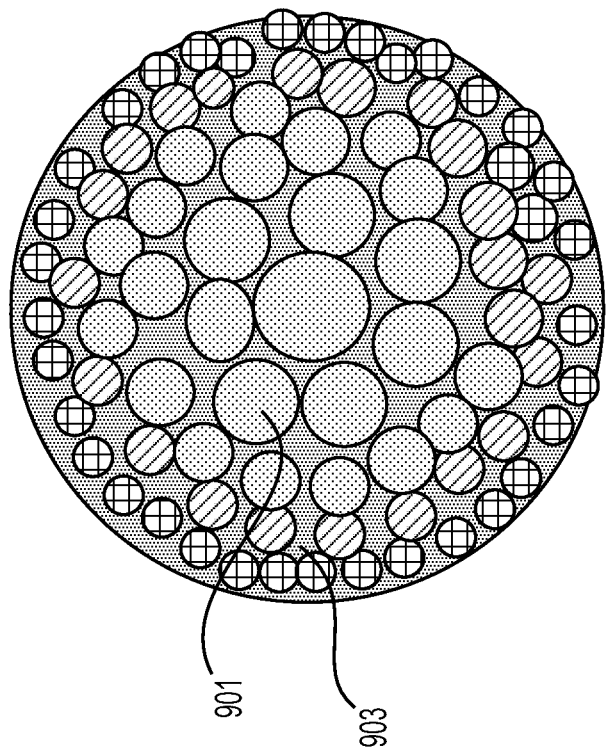
FIGS. 9A-9D illustrate example compositions of active material confined within a scaffolding matrix according to certain example embodiments, where the active material changes composition along the particle radius from the center (core) to the perimeter.
Figure 9A:
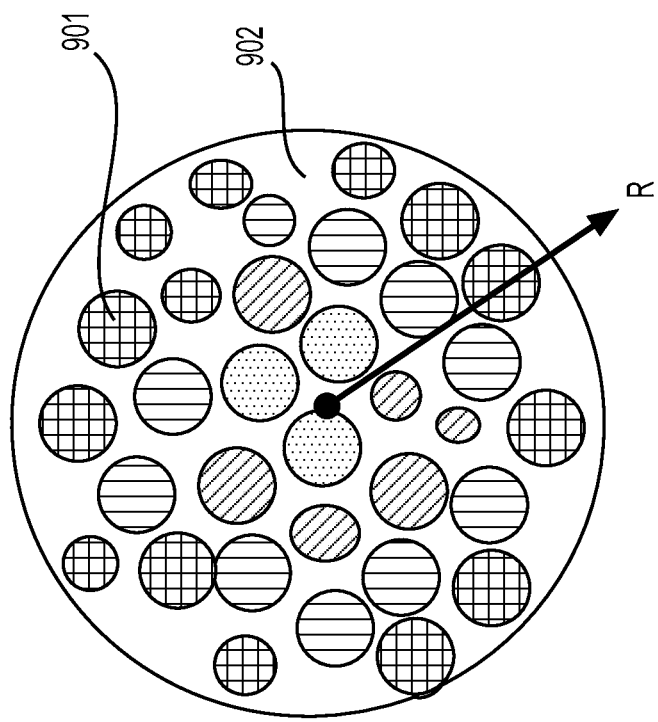
Figure 9D:
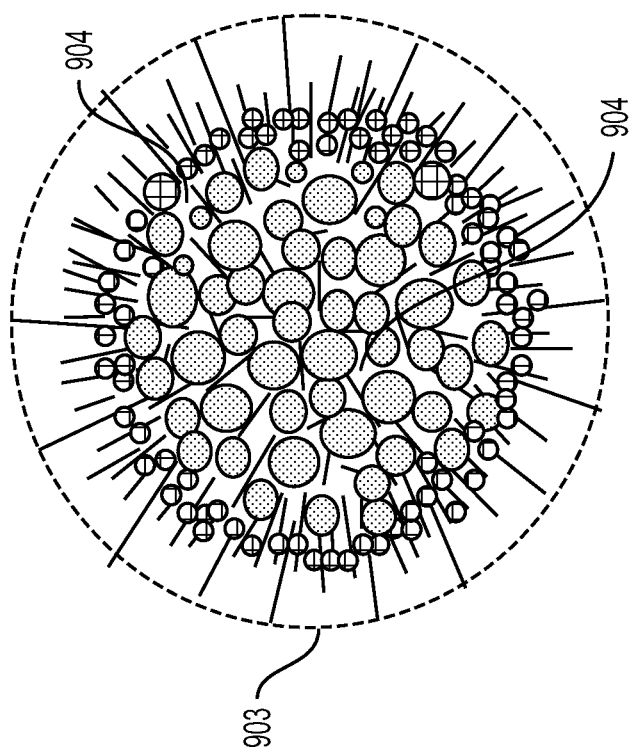
Figure 9C:
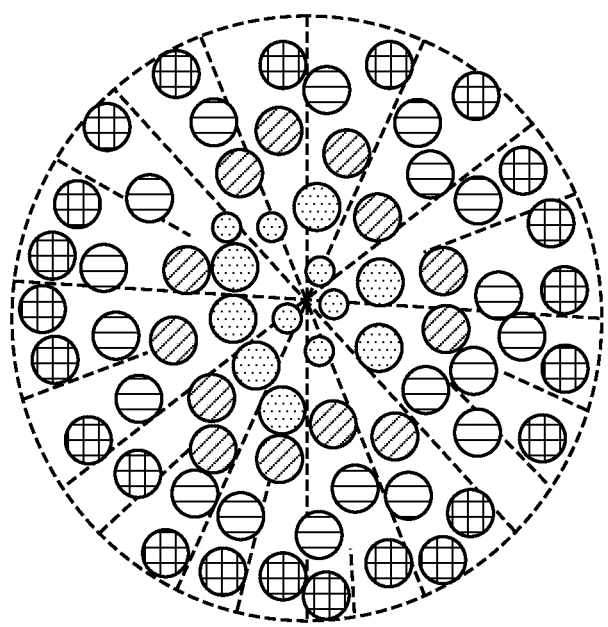

FIGS. 9A-9D illustrate example compositions of active material confined within a scaffolding matrix according to certain example embodiments, where the active material changes composition along the particle radius from the center (core) to the perimeter. In the illustration, a difference in shading symbolizes different active material compositions. FIGS. 9A and 9C illustrate example embodiments where the scaffolding matrix 902 is uniform, while FIGS. 9B and 9D illustrate example embodiments where the scaffolding matrix 903 is also changing from the center to the perimeter of the particles. FIGS. 9A and 9B illustrate example embodiments where the active material 901 fills the scaffold pores completely, while FIGS. 9C and 9D illustrate example embodiments where the active material 901 fills the scaffold pores only partially, leaving some pore 904 volume for active material expansion during battery operation.

Figure 10A:
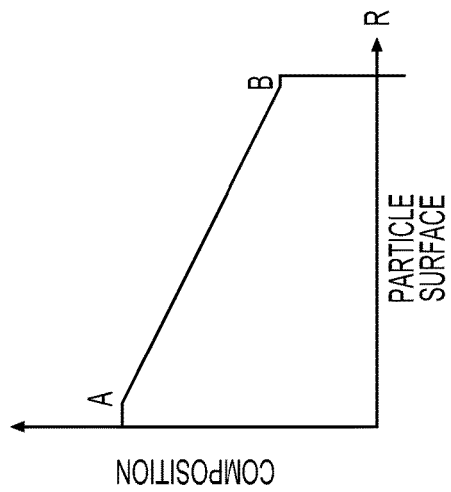
FIGS. 10A-10C illustrate examples of the profiles for the changes in average composition of active material along the particle radius from the center (core) to the perimeter according to certain example embodiments, where the active material is confined within a scaffolding matrix.
Figure 10B:
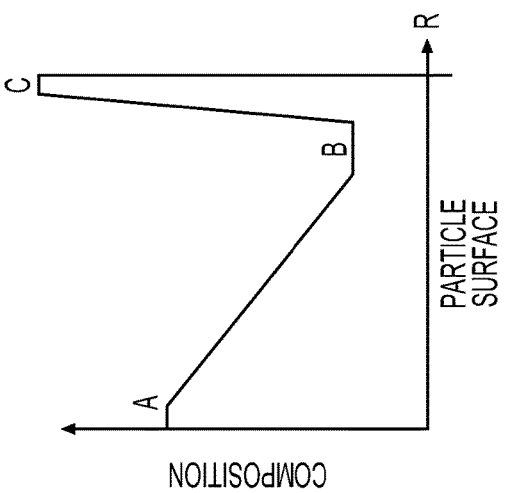
Figure 10C:
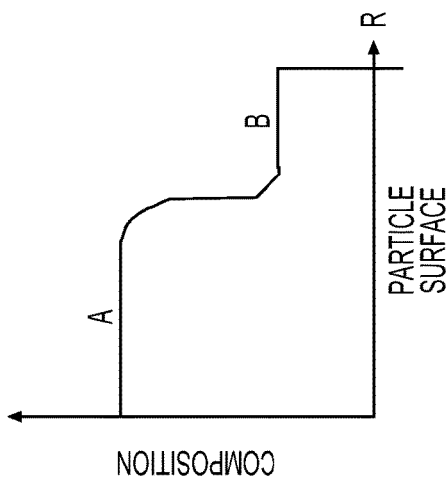

FIGS. 10A-10C illustrate examples of the profiles for the changes in average composition of active material along the particle radius from the center (core) to the perimeter according to certain example embodiments, where the active material is confined within a scaffolding matrix. As shown, the composition may change in different ways from the core (region "A") to the surface (region "B") to even a top surface (region "C") portion of the particle.

For some designs, the hardness of the high capacity active material may change from the center to the perimeter of the composite particle. This change in hardness (particularly the change in hardness in the expanded state of the active material) provides various advantages when the composite material is used in batteries. Overall, it may be advantageous for the high capacity active material to exhibit low hardness (be soft) (particularly in the expanded state) so that it can plastically deform during expansion and better adapt to the shape of the scaffolding matrix material pore. In most applications, however, where such a high capacity active material exhibits significant volume changes, it may be more important for the active material to be soft near the surface of the composite particles than in the core. Indeed, harder active material near the surface will result in higher (for a given pore volume and fraction of the active material) volume changes near the surface, which, in turn, may induce formation of cracks and separation of the particles within an electrode (e.g., due to the breakage of contact with a binder).

For some designs, the elastic modulus of the high capacity active material may change from the center to the perimeter of the composite particle. A lower value of elastic modulus of the active material results in a smaller resistance of the composite to elastic deformation, which may be important for both calendaring (densification) of the electrode and minimizing composite volume changes during active material expansion. Therefore, a lower value of elastic modulus may be beneficial for both maximizing electrode volumetric capacity (and thus maximizing cell energy density) and maximizing electrode stability during cycling (and thus maximizing cycle life of the cell). However, materials with a lower elastic modulus do not necessarily exhibit the highest energy density when used in cells. Accordingly, reducing the average value of the elastic modulus near the surface of the particles may be more important than doing so in the core. Thus, for some battery applications, it may be advantageous to utilize composite particles with lower elastic modulus active material(s) near the particle surface.

Figure 11A:
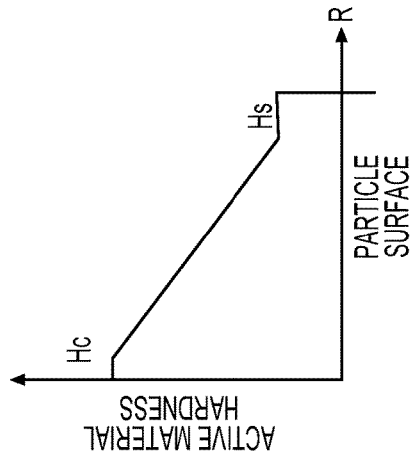
FIGS. 11A-11D illustrate examples of the profiles for the changes in the selected mechanical properties of active material (such as hardness in FIGS. 11A and 11B, and modulus in FIGS. 11C and 11D) along the particle radius from the center (core) to the perimeter according to certain example embodiments, where the active material is confined within a scaffolding matrix.
Figure 11B:
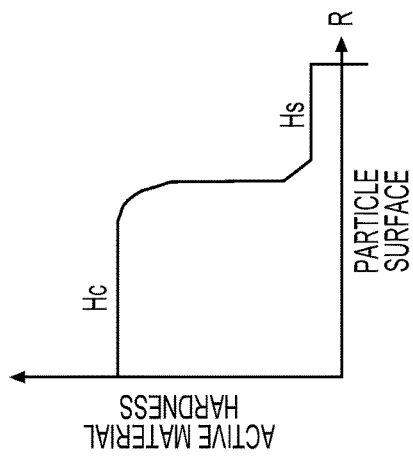
Figure 11C:
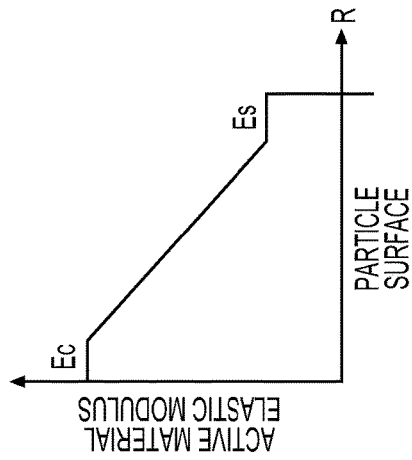
Figure 11D:

FIGS. 11A-11D illustrate examples of the profiles for the changes in the selected mechanical properties of active material (such as hardness in FIGS. 11A and 11B, and modulus in FIGS. 11C and 11D) along the particle radius from the center (core) to the perimeter according to certain example embodiments, where the active material is confined within a scaffolding matrix. FIGS. 11A and 11B show example profiles of the average hardness ("H") of the active material along the radius of the composite particle from the core ("Hc") to the surface ("Hs"). FIGS. 11C and 11D show example profiles of the average elastic modulus ("E") of the active material along the radius of the composite particle from the core ("Ec") to the surface ("Es") to the top surface ("Ets").

For some designs, the density of the high capacity active material may change from the center of a composite particle to the perimeter of the composite particle. Higher density of the active material in the core of the composite particles may result in a higher density of the core of the composite particles. Such particles may yield more uniform electrodes, which, in turn, typically result in better cell performance characteristics. Lower density of the active material near the perimeter of the particles may also be linked to the presence of pores within such active material. The presence of pores, in turn, reduces the hardness, elastic modulus, and overall volume changes in the active material, which (as discussed above) may be more important to minimize near the surface of the composite particles than in the center.

For some designs, the density of the composite particle may change from the center to the perimeter of the composite particle. In one example, the highest density may be disposed near the center of the composite particle. When processed into electrodes, such particles may offer more stable performance in cells.

Figure 12B:
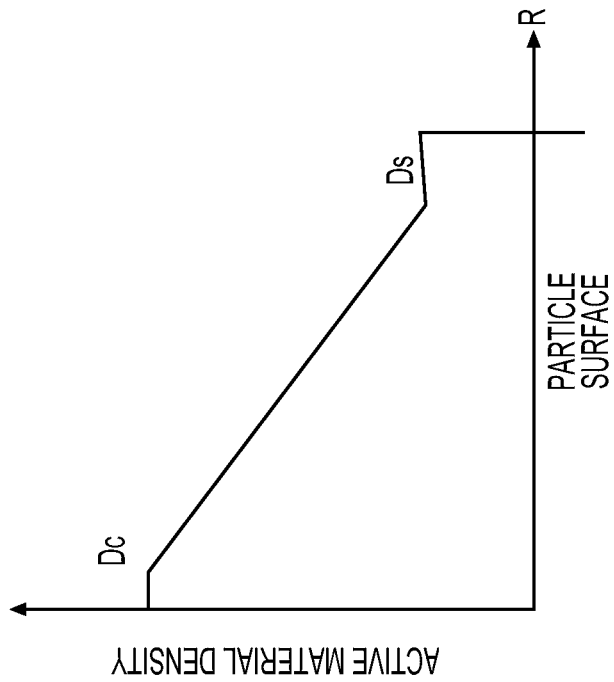
FIGS. 12A-12B illustrate examples of the profiles for the changes in density of active material along the particle radius from the center (core) to the perimeter according to certain example embodiments, where the active material is confined within a scaffolding matrix.
Figure 12A:
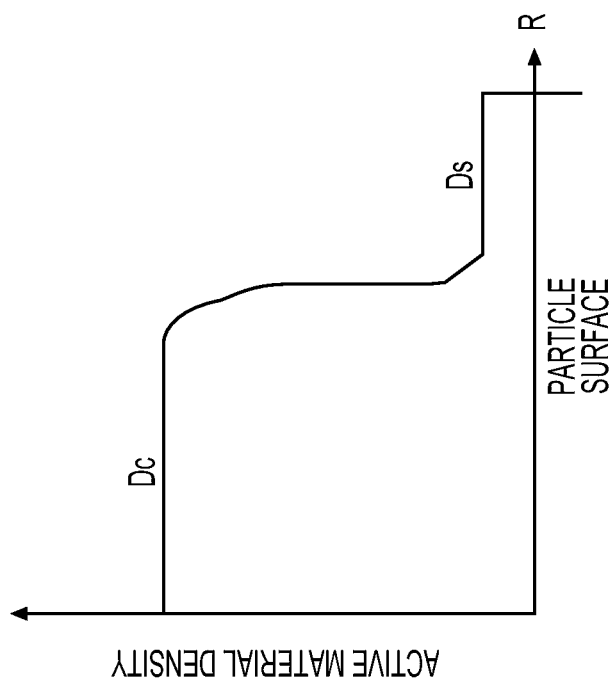

FIGS. 12A-12B illustrate examples of the profiles for the changes in density of active material along the particle radius from the center (core) to the perimeter according to certain example embodiments, where the active material is confined within a scaffolding matrix. As shown, the density ("d") may change in different ways from the core ("dc") to the surface ("ds").

For some designs, the weight fraction of the high capacity active material (to the total weight of the composite) may change from the center of a composite particle to the perimeter of the composite particle. A lower fraction of the high capacity active material and higher fraction of the scaffolding matrix material near the perimeter of the composite particles typically enhances stability of the particles during cycling (for example, due to minimizing volume changes within the surface layer of the composite particles). In some applications, a higher fraction of the high capacity active material near the core of the particles increases the energy density of the electrodes based on such particles, while typically only moderately reducing its cycle stability.

Figure 13B:
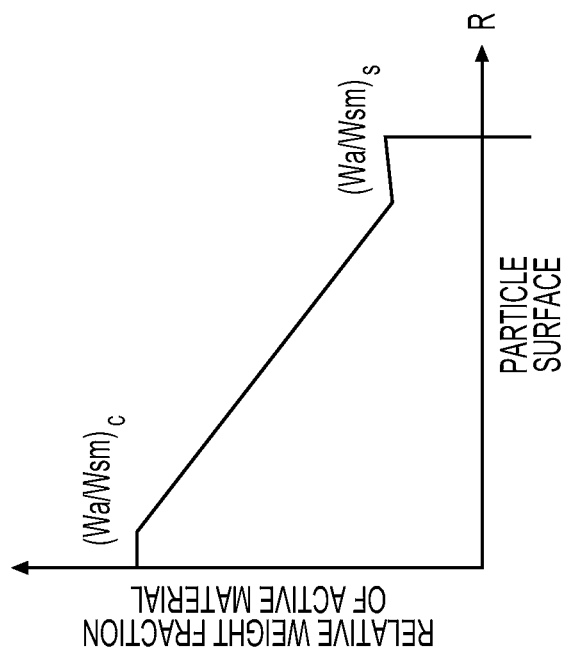
FIGS. 13A-13B illustrate examples of the profiles for the changes in the (Wa/Wsm) relative weight fraction of active material relative to the scaffolding matrix (or the scaffolding matrix and the rest of the composite, including the protective coating and the protective shell or additional filler material, if present in the composite) along the particle radius from the center (core) to the perimeter according to certain example embodiments, where the active material is confined within a scaffolding matrix.
Figure 13A:
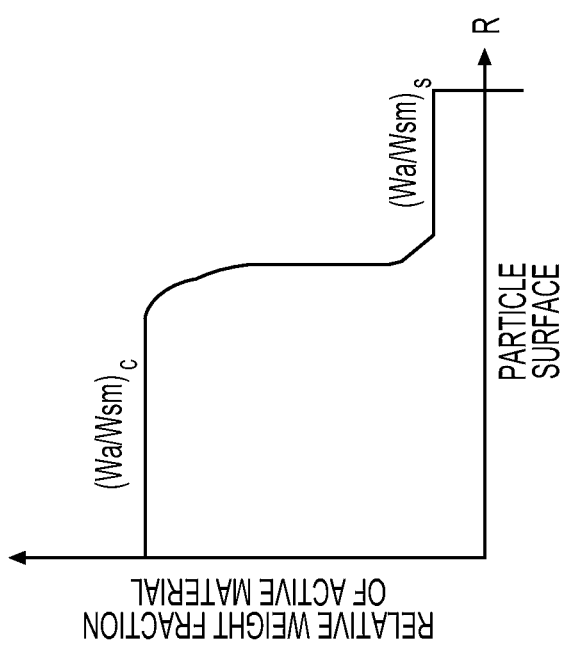

FIGS. 13A-13B illustrate examples of the profiles for the changes in the relative weight fraction (Wa/Wsm) of active material ("Wa") relative to the scaffolding matrix ("Wsm") (or the scaffolding matrix and the rest of the composite, including the protective coating and the protective shell or additional filler material, if present in the composite) along the particle radius from the center (core) to the perimeter according to certain example embodiments, where the active material is confined within a scaffolding matrix. The suitable relative weight fraction in the core of the particle (Wa/Wsm)$_c$ or near the surface (Wa/Wsm)$_s$ may vary depending on the application and particular chemistry. However, for many applications the (Wa/Wsm)$_c$ may preferably be the range from 0.5 to 30, and (Wa/Wsm)$_s$ may preferably be in the range from 0 to 5.

For some designs, the volume fraction of the high capacity active material (to the total volume of the composite) may change from the center of a composite particle to the perimeter of the composite particle. A lower volume fraction of the high capacity active material near the perimeter of the composite particles reduces cycling-induced stresses near the surface of the particles, which enhances the electrode stability during cycling and thus cell cycle life. For example, in cases where high capacity anode materials for Li-ion batteries (e.g., Si-comprising materials) are used, increasing both the pore volume and the volume occupied by the scaffolding matrix material greatly enhances cycle stability of the cells comprising such composite electrodes particles. Such a relative volume increase of the scaffold and pores may be more important near the surface of the active particles. Compared to uniform composite particles of identical theoretical energy density, composite particles with a higher volume fraction of the active material in the center generally exhibit better performance characteristics, such as better cycle stability.

Figure 14B:
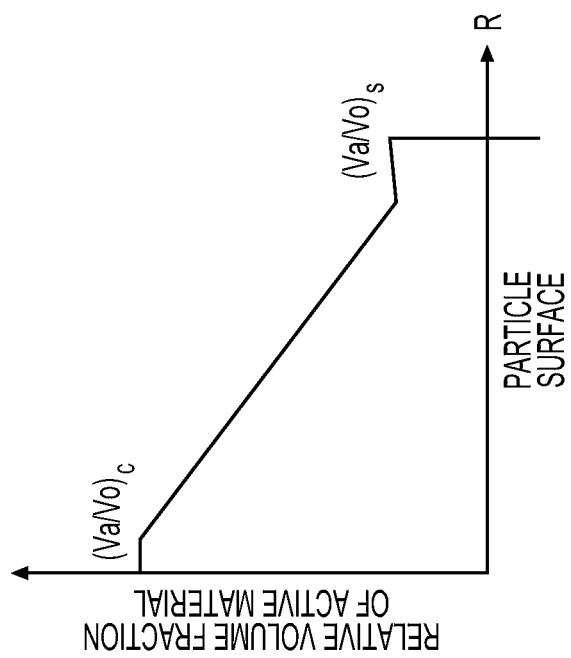
FIGS. 14A-14B illustrate examples of the profiles for the changes in the (Va/Vo) relative volume fraction of active material (relative to the total volume of the composite) along the particle radius from the center (core) to the perimeter according to certain example embodiments, where the active material is confined within a scaffolding matrix.
Figure 14A:
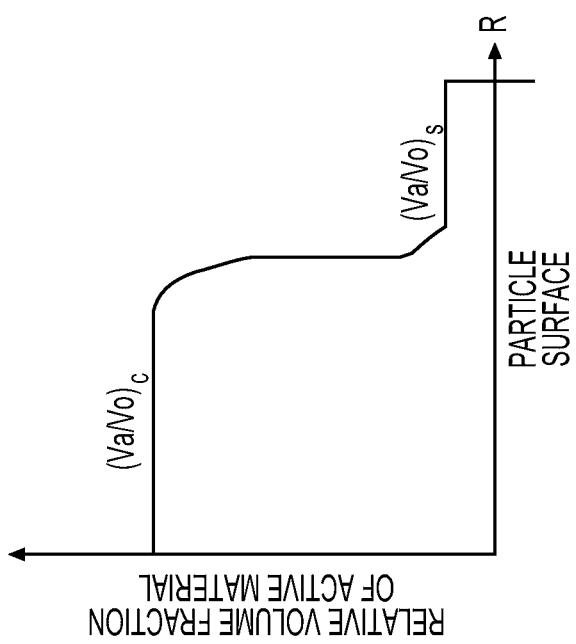

FIGS. 14A-14B illustrate examples of the profiles for the changes in the relative volume fraction (Va/Vo) of active material ("Va") relative to the total or overall volume ("Vo") of the composite along the particle radius from the center (core) to the perimeter according to certain example embodiments, where the active material is confined within a scaffolding matrix. The suitable relative volume fraction in the core of the particle (Va/Vo)$_c$ or near the surface (Va/Vo)$_s$ may vary depending on the application and particular chemistry, and whether or not the active material is already in the expanded state. However, for many applications the (Va/Vo)$_c$ may preferably be within the range from 0.1 to 60 and (Va/Vo)$_s$ may preferably be in the range from 0 to 6. The suitable average value of the relative volume fraction of the active material within a composite should be larger than 0.1 but smaller than 60. An average volume fraction of the active material that is less than 0.1 may significantly limit the volumetric capacity of the composite-based electrodes and the resulting energy density of the battery cells utilizing such composites. An average volume fraction of the active material that is greater than 60 typically limits the composite particle stability or rate performance to an unsatisfactory level.

Various methods may be utilized to produce active material-scaffolding composite particles with a variable composition of the active material along the particle radius. In some methods of composite particle formation, the scaffolding matrix particles may be produced first and subsequently gradually infiltrated with active material of variable composition, as well as with an optional protective layer and protective shell. In other methods of composite particle formation, the variable composition of active material may be produced simultaneously with the formation of the composite particles.

An example method of scaffolding matrix and active material comprising composite particle synthesis, where the active material exhibits a variable composition along the radius of the particles, may comprise, for example: (i) forming a suspension of nanoparticles of active material "A" (or active material A precursor) coated with the precursor of scaffolding matrix material (such as one type of scaffolding matrix precursor); (ii) forming another suspension of nanoparticles of active material "B" (or active material B precursor) coated with the precursor of matrix material; (iii) inducing a gradual aggregation of the type A active material (or its precursor) nanoparticles from the nanoparticle suspension; (iv) over time adding suspension of the type B active material (or its precursor) nanoparticles such that more and more of the type B coated nanoparticles are attached to the outer layer of the aggregate particles; (v) optionally coating the outer layer of the aggregate particles with another (shell layer) of a precursor matrix material; (vi) stabilizing the formed aggregate particles in a suspension and separating them from the solvent: and (vii) transforming the precursor material of the matrix (and, if relevant, the precursor active material) to the suitable composite of scaffolding matrix filled with active material (for example, by a thermal treatment) and thus obtaining aggregate particles with gradually changing (from the center of the particles to the perimeter of the particles) composition of the active material, wherein the scaffolding matrix material of each of the composite aggregate particles structurally supports the active material, electrically interconnects the active material, and assists in minimizing the changes in volume of the aggregate particles in spite of changes in volume of the active material.

Another example method of scaffolding matrix-comprising composite particle synthesis, where the active material exhibits variable composition along the radius of the particles, may comprise, for example: (i) forming scaffolding matrix material particles; (ii) forming a solution of one type (type "A") active material precursor that wets the scaffolding matrix material; (iii) forming a solution of another type (type "B") active material precursor; (iv) infiltrating solution A into the core of the matrix particles and drying this solution (by the action of capillary condensation the active material precursor A will mostly precipitate into the core of porous matrix particles); (v) transforming the precursor into active material A (for example, by thermal treatment); (vi) repeating steps (iv) and (v) several times, gradually replacing at least some of the precursor solution A with the precursor solution B, thus producing scaffolding matrix particles filled with gradually changing (from the center of the particles to the perimeter of the particles) composition of the active material; (vii) optionally coating the surface of the active material with a protective layer; and (viii) optionally forming a protective shell to prevent or minimize reaction of the active material with the electrolyte (during battery operation).

Another example method of scaffolding matrix-comprising composite particle synthesis, where the active material exhibits variable composition along the radius of the particles, may comprise, for example: (i) either nucleating particles consisting of one type of precursor matrix material by a CVD process in a tubular furnace or introducing a pre-formed scaffolding matrix material powder into the furnace; (ii) feeding active material precursor (referred to for generality below as a "type A" active material precursor) into the reactor where scaffold particles are formed in order to infiltrate the scaffold with the active material A (or its precursor A); (iii) feeding another active material precursor (referred to for generality below as a "type B" active material precursor) into the reactor at a later stage, where scaffold particles pre-infiltrated with the precursor A (or active material A) (e.g., mostly in the core of the particles) could be then infiltrated with the active material B (or a precursor B) thus forming a desired gradient of active materials (A-B) within each composite particle; (iv) optionally coating the outer layer of the A-B-scaffold material composite particles with a shell layer of another (e.g., "type C") precursor matrix material; and (v) if needed, transforming the precursor material of the matrix to the suitable scaffolding matrix material, thus obtaining scaffolding matrix particles with gradually changing (from the center of the particles to the perimeter of the particles) composition of the active material.

For the formation of composite particles with tunable (along the radius) active material hardness, elastic modulus, or other mechanical properties, similar methods may be employed as for the fabrication of composite particles with a tunable active material composition. In this case, though, it may be advantageous that the mechanical properties of interest vary significantly with varying of the composition of the selected active materials.

Various methods may be utilized to produce composite scaffolding matrix-active material particles with variable size of active material particles along the radius of the particles. The methods may vary depending on the desired degree of control and the composition of both the scaffolding matrix material and active material.

In one example, the scaffolding matrix particles may be prepared first and have gradually changing surface chemistry or pore size properties. In this case, filling the scaffolding matrix particles with active material (either through gaseous phase deposition or through solution chemistry infiltration and optional subsequent thermal treatment) may induce the desired gradient in the size of the active material particles.

Another example method of scaffolding matrix and active material comprising composite particle synthesis, where the active material exhibits variable particle size along the radius of the particles, may comprise, for example: (i) forming a suspension of size "1" (e.g., large) nanoparticles of active material coated with precursor scaffolding matrix material; (ii) forming a suspension of size "2" (e.g., smaller) nanoparticles of active material (or its precursor) coated with precursor scaffolding matrix material; (iii) forming a suspension of size "3" (e.g., still smaller) nanoparticles of active material (or its precursor) coated with precursor scaffolding matrix material; (iv) inducing a gradual aggregation of the size 1 active material (or its precursor) nanoparticles from the nanoparticle suspension; (v) over time adding suspension of the size 2 active material (or its precursor) nanoparticles so that more and more of the size 2 coated nanoparticles are attached to the outer layer of the aggregate particles; (vi) over time adding suspension of the size 3 active material (or its precursor) nanoparticles so that more and more of the size 3 coated nanoparticles are attached to the outer layer of the aggregate particles; (vii) optionally coating the outer layer of the aggregate particles with another (shell layer) of a precursor matrix material; (viii) stabilizing the formed aggregate particles in a suspension and separating them from the solvent; and (ix) transforming the precursor material of the matrix (and, if relevant, the precursor active material) to the suitable composite of scaffolding matrix filled with active material (for example, by a thermal treatment), thus obtaining aggregate particles with gradually changing (from the center of the particles to the perimeter of the particles) size of the active material, wherein the scaffolding matrix material of each of the composite aggregate particles structurally supports the active material, electrically interconnects the active material, and assists in minimizing the changes in volume of the aggregate particles in spite of the changes in volume of the active material.

When scaffold particles with gradual pore sizes are formed first, active material in a suspension form can be infiltrated into the particles. Utilization of active material suspensions with particle sizes 1, 2, and 3 (as discussed above) provide the ability to achieve a desired active particle size distribution within a scaffold particle.

Various methods may be utilized to produce composite scaffolding matrix-active material particles with a weight fraction of active material varying along the radius of the particles. The methods may vary depending on the desired degree of control and the composition of both the scaffolding matrix material and active material.

In one example, the scaffolding matrix particles may be prepared first and have a gradually changing pore size or gradually changing pore volume. In this case, filling the scaffolding matrix particles with active material (either through gaseous phase deposition or through solution chemistry infiltration and optional subsequent thermal treatment) may induce the desired gradient in the weight fraction of the active material along the radial direction of the particles.

Another example method of scaffolding matrix and active material comprising composite particle synthesis, where the active material exhibits a variable weight fraction along the radius of the particles, may comprise, for example: (i) forming a suspension of size "1" nanoparticles of active material coated with a layer of a given thickness of precursor scaffolding matrix material; (ii) forming a suspension of size "2" nanoparticles of active material (or its precursor) coated with precursor scaffolding matrix material of the same thickness as size 1; (iii) inducing a gradual aggregation of the size 1 active material (or its precursor) nanoparticles from the nanoparticle suspension; (iv) over time adding suspension of the size 2 active material (or its precursor) nanoparticles of active material from the nanoparticle suspension so that more and more of the size 2 coated nanoparticles are attached to the outer layer of the aggregate particles (since the thickness of the scaffold material precursor coating may be the same for both sizes of the particles, gradual addition of the size 2 active material nanoparticles results in a gradual change in the weight fraction of the active material); (v) optionally coating the outer layer of the aggregate particles with another (shell layer) of a precursor matrix material; (vi) stabilizing the formed aggregate particles in a suspension and separating them from the solvent; and (vii) transforming the precursor material of the matrix (and, if relevant, the precursor active material) to the suitable composite of scaffolding matrix filled with active material (for example, by a thermal treatment), thus obtaining aggregate particles with gradually changing (from the center of the particles to the perimeter of the particles) weight fraction of the active material, wherein the scaffolding matrix material of each of the composite aggregate particles structurally supports the active material, electrically interconnects the active material, and assists in minimizing changes in volume of the aggregate particles in spite of changes in volume of the active material.

Another example method of scaffolding matrix and active material comprising composite particle synthesis, where the active material exhibits a variable weight fraction along the radius of the particles, may comprise for example: (i) forming a suspension of nanoparticles of active material coated with a layer of thickness "T1" of precursor scaffolding matrix material; (ii) forming a suspension of nanoparticles of active material (or its precursor) coated with precursor scaffolding matrix material of a different thickness "T2;" (iii) inducing a gradual aggregation of the active material (or its precursor) nanoparticles from the first nanoparticle suspension; (iv) over time adding the second suspension of active material (or its precursor) nanoparticles so that more and more of the nanoparticles coated with a different thickness layer are attached to the outer layer of the aggregate particles (since the thickness of the scaffold material precursor coating may be different for both suspensions, gradual addition of the second type of active material nanoparticles results in a gradual change in the weight fraction of the active material); (v) optionally coating the outer layer of the aggregate particles with another (shell layer) of a precursor matrix material; (vi) stabilizing the formed aggregate particles in a suspension and separating them from the solvent: and (vii) transforming the precursor material of the matrix (and, if relevant, the precursor active material) to the suitable composite of scaffolding matrix filled with active material (for example, by a thermal treatment), thus obtaining aggregate particles with gradually changing (from the center of the particles to the perimeter of the particles) weight fraction of the active material, wherein the scaffolding matrix material of each of the composite aggregate particles structurally supports the active material, electrically interconnects the active material, and assists in minimizing changes in volume of the aggregate particles in spite of changes in volume of the active material.

Another example method of scaffolding matrix-comprising composite particle synthesis, where the active material exhibit variable weight fraction along the radius of the particles, may comprise, for example: (i) either using pre-formed scaffold material "A" particles or nucleating scaffold particles consisting of one type of precursor matrix material (referred to for generality below as a "type A" scaffolding precursor) by a CVD process in a tubular furnace; (ii) adding an increased amount of another type of precursor matrix material (referred to for generality below as a "type B" scaffolding precursor) along the reactor, causing gradual change in particle composition; (iii) feeding active material precursor into the reactor where scaffold particles are formed to achieve desired weight fraction distribution of active material in the particle; (iv) optionally coating the outer layer of the aggregate A-B composite particles filled with active material with another (shell layer) of another (e.g., "type C") precursor matrix material; and (v) transforming the precursor material of the matrix to the suitable scaffolding matrix material, thus obtaining scaffolding matrix particles with a gradually changing (from the center of the particles to the perimeter of the particles) weight fraction of active material.

Various methods could be utilized to produce composite scaffolding matrix-active material particles with a volume fraction of active material varying along the radius of the particles. The methods may vary depending on the desired degree of control and the composition of both the scaffolding matrix material and active material.

In one example, the scaffolding matrix particles may be prepared first and have a gradually changing pore size or gradually changing pore volume. In this case, controlled filling of the scaffolding matrix particles with active material (either through gaseous phase deposition or through solution chemistry infiltration and optional subsequent thermal treatment) may induce the desired gradient in the volume fraction of the active material along the radial direction of the particles.

Another example method of scaffolding matrix and active material comprising composite particle synthesis, where the active material exhibits a variable volume fraction along the radius of the particles, may comprise, for example: (i) identifying two precursors for active material that yield different volume fractions of the active material after transformation or heat treatment (referred to for generality below as precursors "A" and "B"); (ii) forming a suspension of nanoparticles of type A precursor coated with a layer of precursor scaffolding matrix material; (iii) forming a suspension of nanoparticles of type B precursor coated with a layer of precursor scaffolding matrix material; (iv) inducing a gradual aggregation of the type A active material precursor nanoparticles from the nanoparticle suspension; (v) over time adding suspension of the coated type B active material precursor nanoparticles from the nanoparticle suspension so that more and more of the type B coated nanoparticles are attached to the outer layer of the aggregate particles; (vi) optionally coating the outer layer of the aggregate particles with another (shell layer) of a precursor matrix material; (vii) stabilizing the formed aggregate particles in a suspension and separating them from the solvent; and (viii) transforming the precursor active materials A and B to the suitable composite of scaffolding matrix filled with active material (for example, by a thermal treatment). Because different precursors yield different volume fractions of the active material, aggregate particles obtained in this way exhibit gradually changing (from the center of the particles to the perimeter of the particles) volume fraction of the active material, wherein the scaffolding matrix material of each of the composite aggregate particles structurally supports the active material, electrically interconnects the active material, and assists in minimizing changes in volume of the aggregate particles in spite of changes in volume of the active material.

Another example method of scaffolding matrix and active material comprising composite particle synthesis, where the active material exhibits a variable volume fraction along the radius of the particles, may comprise, for example: (i) identifying a pore former (e.g., material that produces pores upon decomposition or completely decomposes upon a particular stimulus, such as heat treatment, or can completely dissolve in a solvent that does not dissolve or unfavorably affect that scaffold material precursor and active material) that is miscible with a precursor of the scaffolding matrix material; (ii) forming a suspension of active material nanoparticles (or active material precursor nanoparticles) coated with a layer of the precursor scaffolding matrix material; (iii) forming a suspension of active material nanoparticles (or active material precursor nanoparticles) coated with the layer of precursor scaffolding matrix material mixed with the pore former material; (iv) inducing a gradual aggregation of the active material (or precursor) nanoparticles from the suspension of active material nanoparticles (or active material precursor nanoparticles) coated with the layer of the precursor of scaffolding matrix material mixed with the pore former material; (v) over time adding suspension of the coated active material (or precursor) nanoparticles from the regular nanoparticle suspension so that less and less pore forming material is incorporated into the outer layer of the aggregate particles; (vi) optionally coating the outer layer of the aggregate particles with another (shell layer) of a precursor matrix material; (vi) stabilizing the formed aggregate particles in a suspension and separating them from the solvent; and (vii) transforming the precursor material to the suitable composite of scaffolding matrix filled with active material (for example, by a thermal treatment). Because the pore former increases pore volume, aggregate particles obtained in this way exhibit gradually changing (from the center of the particles to the perimeter of the particles) volume fraction of the active material, wherein the scaffolding matrix material of each of the composite aggregate particles structurally supports the active material, electrically interconnects the active material, and assists in minimizing changes in volume of the aggregate particles in spite of changes in volume of the active material.

Similarly, a CVD process utilizing scaffold precursors "A" and "B," with simultaneous feeding of active material into the CVD precursor, may be another suitable method of scaffolding matrix and active material comprising composite particle synthesis, where the active material exhibits a variable volume fraction along the radius of the particles.

For some designs, more than one property of the active material (for example, more than one of the previously discussed properties) may be configured to change from the center to the perimeter of the composite particle. As an example, the active material may exhibit changes in particle size or particle shape from the center to the perimeter of the particle and additionally exhibit changes in the composition from the center to the perimeter of the particle. This allows various favorable combinations of properties when active material-scaffolding matrix composite particles are produced and used in batteries.

For some designs, both the high capacity active material and the scaffolding matrix may change from the center to the perimeter of the composite particle. In this case, at least one of the properties of the scaffolding matrix (composition, structure, porosity, pore shape, pore size, pore orientation, pore volume, elastic modulus, density, hardness, etc.) may change from the center of a composite particle to the perimeter of the composite particle and at least one of the properties of the active material (composition, structure, porosity, size, elastic modulus, density, hardness, etc.) may change from the center of the composite particle to the perimeter of the composite particle. This allows various favorable combinations of properties when such composite particles are used in batteries. FIGS. 9B and 9D illustrate two examples of such simultaneous changing properties of the scaffolding matrix and active material within a single composite particle.

For some designs, the high capacity active material confined (e.g., infiltrated) within a scaffolding matrix material may be coated with a thin and in some cases conformal layer of a so-called "protective" material. The purpose of such a protective layer may range from protection of the active material against its reaction with ambient air (such as oxidation) to the protection of the active material against unfavorable reactions with the electrolyte. A thickness of the protective layer from approximately 0.2 nm to approximately 10 nm has been found to work well. The composition of the protective layer depends on a particular chemistry of the active material and the cell. For example, in the case of Si, Sn, Sb, Al, Fe, and other metal-based active materials using a protective layer comprising C and, in some cases, H atoms (e.g., with C atoms comprising at least 20% of the atomic fraction of the protective layer composition), has been found to work well.

As discussed above, for certain active materials of interest (e.g., silicon anodes or metal halide cathodes in the case of Li-ion batteries), the storing and releasing of these ions (e.g., Li ions in a Li-ion battery) causes a substantial change in volume of the active material, which, in conventional designs, may lead to irreversible mechanical damage, and ultimately a loss of contact between individual electrode particles or between the electrode and underlying current collector. Moreover, it may lead to continuous growth of the SEI around such volume-changing particles, particularly on the anodes. The SEI growth, in turn, consumes Li ions and reduces cell capacity. Formation of scaffold-active material composites overcomes some of these challenges or significantly reduces their impact. In some designs as provided for herein, electrode stability may be further enhanced by a "shell" coating, where such a coating is permeable for active ions (e.g., a metal ion in the case of a metal-ion battery, such as a Li ion in the case of a Li-ion battery) but not permeable to electrolyte solvent. Such a shell protects active material from unfavorable interactions with the electrolyte. An average thickness of such a shell layer from about 1 nm to about 200 nm (preferably from 3 nm to 60 nm) has been found to work well.

For some designs, this shell layer may be located near or at the surface of the composite particles. In some configurations, such a shell layer may fill the remaining void (pore) space within the portion of the scaffolding matrix material near the perimeter of the composite particles. In this case, undesired sintering (or gluing) of neighboring composite particles by the shell layer may be avoided during shell formation when the shell layer is deposited within, not outside of, the composite particles.

For some designs, the scaffolding matrix material may substantially penetrate through the shell material. For example, this design may be used for the scaffolding matrix to strengthen the shell. As another example, when the scaffolding matrix exhibits high electrolyte ion conductivity, this penetration of the scaffolding matrix enhances the rate performance of the particles and the corresponding cells assembled with electrodes produced with such particles. As another example, when the scaffolding matrix exhibits high electrical conductivity while the sealing shell layer material exhibits lower electrical conductivity, this penetration of the scaffolding matrix through the shell layer enhances both the capacity utilization and the rate performance of the particles. In some configurations (for example, when the surface or bulk ionic conductivity of the scaffolding matrix material is sufficiently high) the shell material (interpenetrating with the scaffolding matrix in the perimeter of the composite particles) may not be ionically conductive. In some configurations the shell material may be solid. In some configurations (for example, when the shell material exhibits low miscibility with an electrolyte) the shell material may be liquid.

The protective shell may be advantageously deposited in a particular region of the scaffolding matrix. For some designs, a protective "shell" coating may infiltrate a porous scaffolding matrix (partially pre-filled with active material particles) in a surface or near-surface region of the composite particles that is characterized by having smaller scaffolding material pores compared to the pores in the core of the particles. For some designs, a protective shell coating may infiltrate a porous scaffolding matrix (partially pre-filled with active material particles) in a surface or near-surface region of the composite particles that is characterized by having scaffolding material pores preferentially oriented parallel to the particle surface. For some designs, a protective shell coating may infiltrate a porous scaffolding matrix (partially pre-filled with active material particles) in a surface or near-surface region of the composite particles that is characterized by having scaffolding material with a lower concentration of defects compared to that of the core of the particles.

For some designs, the shell material may be at least partially deposited from a vapor phase via vapor deposition methods. Examples of such methods include, but are not limited to, chemical vapor deposition (CVD) (including chemical vapor infiltration), atomic layer deposition (ALD), plasma-enhanced ALD, plasma-enhanced CVD, vapor infiltration, and others.

For some designs, the shell material may be at least partially deposited from a solution. Examples of such suitable methods include sol-gel, layer-by-layer deposition, polymer adsorption, surface initiated polymerization, layer formed by nanoparticles adsorption, and others.

For some designs, the shell material may comprise a polymer. In some configurations, it may be advantageous for such a polymer to be an ionically conductive polymer. Multiple routes may be utilized in order to deposit such a polymeric material on the surface of a scaffolding matrix material (including matrix material infiltrated with a high capacity active material). For example, polymerization initiators may be attached to the surface of the porous particles where the target polymer will be grafted, thus forming a thin film (or a coating) of the polymer. As another example, polymers may be first prepared in solution and then attached onto the surface of the particles by using a "graft onto" method. The thickness of the polymer film may be tuned by changing the molecular weight of the polymer. In another example method, a polymer may be deposited using a CVD deposition route.

For some designs, the shell may be a "smart" composite, which can react to, for example, temperature increasing above some threshold value (e.g, above around 60-100° C.) and upon reaching such a temperature effectively prevent either electrical connectivity of the composite particles with other particles and the current collector or ionic connectivity of the composite particles with the electrolyte (for example, by reducing such conductivities by a significant degree— e.g., from around 2 times to around 2,000,000,000,000 times). Such a property may be particularly useful for batteries with flammable organic electrolytes that may experience thermal runaway, such as Li-ion batteries with low potential anodes (e.g., Si, C, Li, Sn, Sb, Al, and others). In this case, the smart shell may act as a particle-level safety mechanism, shutting down electrochemical reactions within the battery cell upon the cell overheating.

Various mechanisms may be utilized for the formulation of such a smart composite shell that reduces electrical conductivity at elevated temperatures. For example, such a shell may comprise a dense brush-like coating composed of an electrically conductive and thermally responsive polymer "A" and electrically insulative and thermally stable material "B" (e.g., ceramic particles or nanowires or another polymer), where each polymer chain of A is tethered to the particle surface from one end and is expanding beyond the material B in a regular state. At ambient temperature, the regions rich with polymer A work as electrically conductive wires connecting the particles to each other and a current collector. However, once the temperature is increased above some relatively high value (e.g., above 80-120° C.), the length of the polymer A will decrease (shrink) so that the outer surface of the coating will become insulative B, thus stopping the electrical connectivity of the individual particles and thus shutting down (or dramatically decreasing the rate of) the electrochemical reactions.

Various mechanisms may be also utilized for the formulation of such a smart composite shell that reduces ionic conductivity at elevated temperatures. For example, such a shell may comprise A-B type block copolymers, where A is an ion conductive polymer and B is an ion nonconductive polymer. The volume ratio may be tuned between approximately 10% and 30% for the block A to find the optimum ratio for obtaining a cylindrical morphology (with cylinders positioned perpendicular to the shell). Such an architecture may have cylinders of block A placed into a matrix of block B. These cylinders may be in the tens of nanometers dimension and used as channels to transfer ions between the particles. Once the temperature of the medium rises above the order-disorder temperature for the block copolymer, the cylindrical conductive channels will become disassembled and mixed with the B block, which will stop or significantly decrease the ionic conductivity of the shell.

Figure 15B:
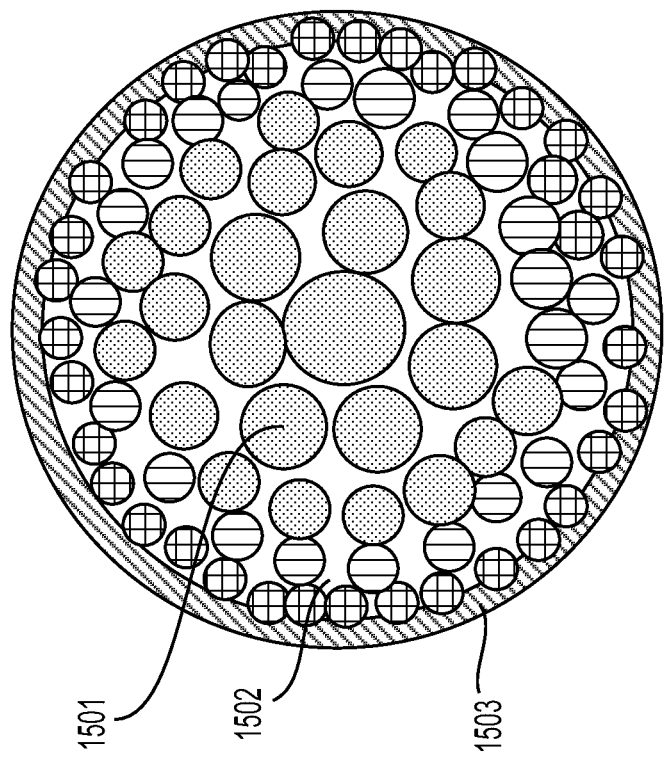
FIGS. 15A-15D illustrate example composite particle compositions according to certain example embodiments, comprising a scaffolding matrix material and high capacity active material confined within the scaffolding matrix, and a protective shell enclosing the composite particles and protecting the active material from unfavorable interactions with electrolyte solvent or ambient environment.
Figure 15A:
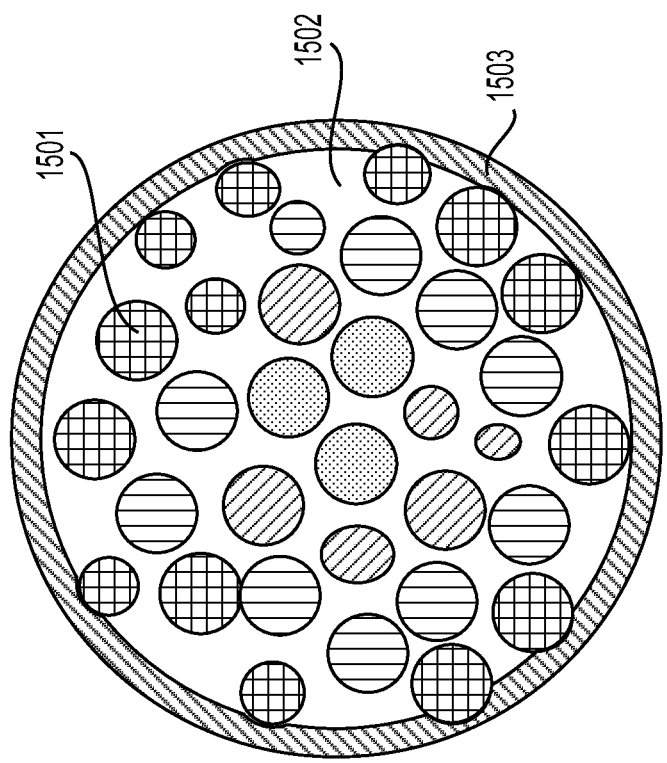
Figure 15D:
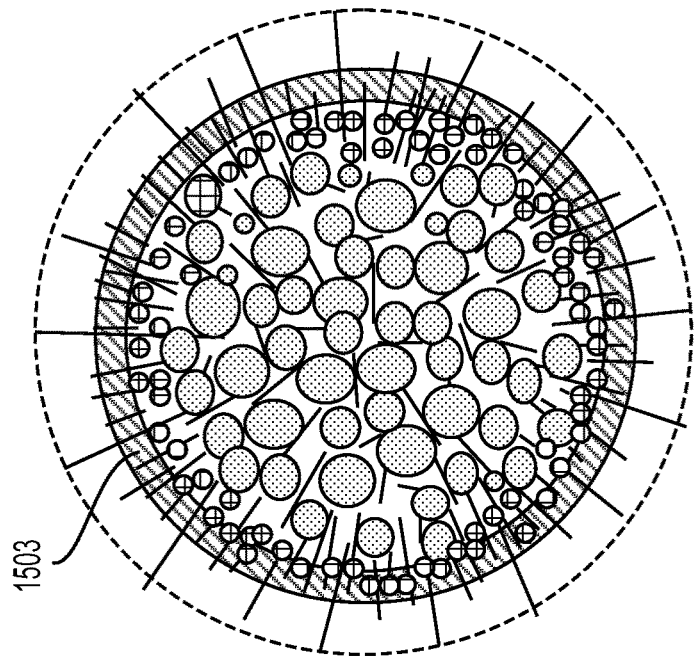
Figure 15C:
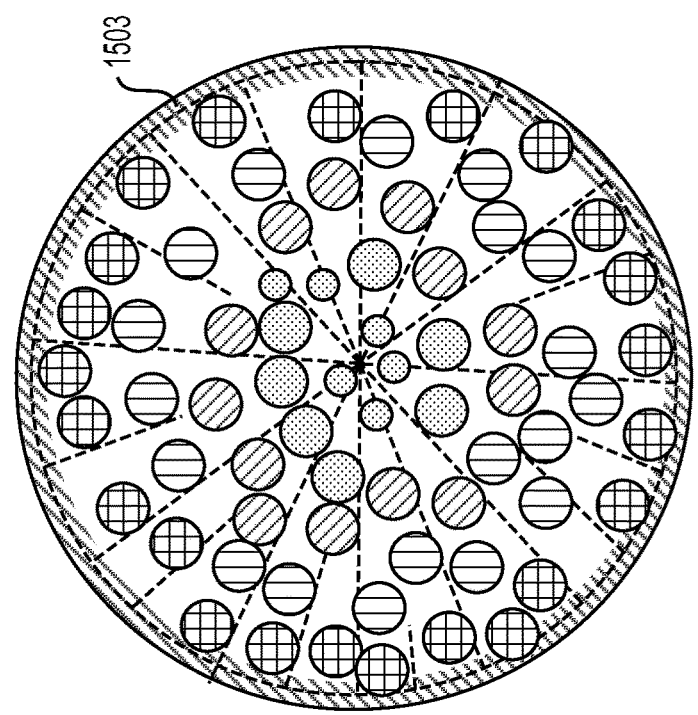

FIGS. 15A-15D illustrate example composite particle compositions according to certain example embodiments, comprising a scaffolding matrix material 1502 and high capacity active material 1501 confined within the scaffolding matrix 1502, and a protective shell 1503 enclosing the composite particles and protecting the active material from unfavorable interactions with electrolyte solvent or ambient environment. FIGS. 15A-15C illustrate example composite particle formulations with the shell 1503 being deposited on the surface of the composite particles. FIG. 15D illustrates an example composite particle formulation with the shell 1503 being deposited in the sub-surface of the composite particles, within the outer portion of the scaffolding matrix 1502.

For some designs, the outer layer of the composite electrode particles may exhibit a high roughness or a high surface area, or both. As discussed above, the composite particles (comprising high capacity, high volume changing materials infiltrated into the scaffolding matrix) may exhibit significantly smaller volume changes during cell operation than the high capacity materials by themselves. However, they may also suffer from slightly larger volume changes (and sometimes from smaller average particle sizes) compared to intercalation-type materials. When a protective shell is applied to such particles, they often tend to bond together, forming large agglomerates. These undesirable factors may contribute to their undesirably faster degradation, lower power, and reduced volumetric energy storage characteristics. Formation of high roughness on the surface of such particles may overcome their shortcomings and improve their performance in battery cells. High roughness, for example, enhances bonding of the particle surface to a binder and, in some cases (when the electrolyte decomposes on the particle surface forming a surface layer) to an SEI layer. High roughness may also prevent gluing the particles together, forming powder aggregates during the deposition of the shell layer (or, at least, making such a gluing very weak and easy to break without damaging the particles). Weakly bonded aggregates may be broken with a mild milling post-processing. In some cases, high roughness may allow electrons to tunnel easier from one particle to the next when the separation distance is relatively small (less than around 5-10 nm). This is because high roughness may induce electric-field concentrated areas near the tips of the hills, which bends the vacuum energy level and increases tunneling probability. Peak-to-valley roughness from 0.5 nm to 500 nm on the particle surface has been found to work well. A high surface area of the top layer may similarly enhance particle bonding with the binder or SEI and, in some cases, effectively induce sufficient roughness and field concentration to enhance electron tunneling and thus conductivity (and rate performance) of the electrode. A surface layer with an internal surface area from 2 to 200 times higher than the geometrical surface area of the perimeter of the composite particle has been found to work well. A porous material coating (e.g., a porous carbon coating) with an average pore size ranging from 2 to 50 nm has been found to work well.

For some designs, the outer rough or high surface area layer of the composite electrode particles may be electrically conductive. Examples of suitable rough layer materials include, but are not limited to, metals, carbon, conductive polymers, and conductive ceramics (such as conductive oxides and nitrides). In cases of high capacity composite anode materials for Li-ion batteries, first cycle losses may be minimized when this layer does not contain electronegative elements in its composition. For some designs, the outer rough or high surface area layer of the composite electrode particles may have a polar surface. In this case, such a surface bonds well with an SEI and most of the binders used in typical Li-ion battery electrodes. When selecting a surface coating for the composite particles, it may be beneficial to ensure that the coating material does not unfavorably (chemically or electrochemically) react with the electrolyte or electrolyte ions during battery operation. For example, Al may work well as a coating material for Li-ion battery cathodes, but not anodes, because it electrochemically reacts with Li. Similarly, Cu or Ni (Cu, in particular) may work well for some of the Li-ion battery anodes, but may corrode (oxidize) if used in high voltage (above around 3-3.5 V) cathodes.

Figure 16B:
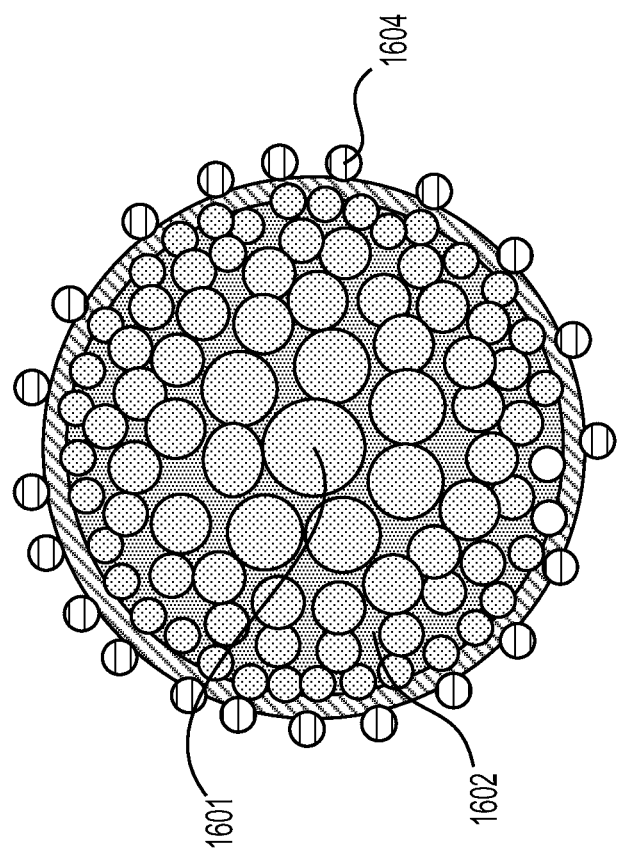
FIGS. 16A-16D illustrate example composite particle compositions according to certain example embodiments, comprising a scaffolding matrix material and active high capacity material confined within the scaffolding matrix (and optionally a protective shell), and having a rough or high surface area outer surface.
Figure 16A:
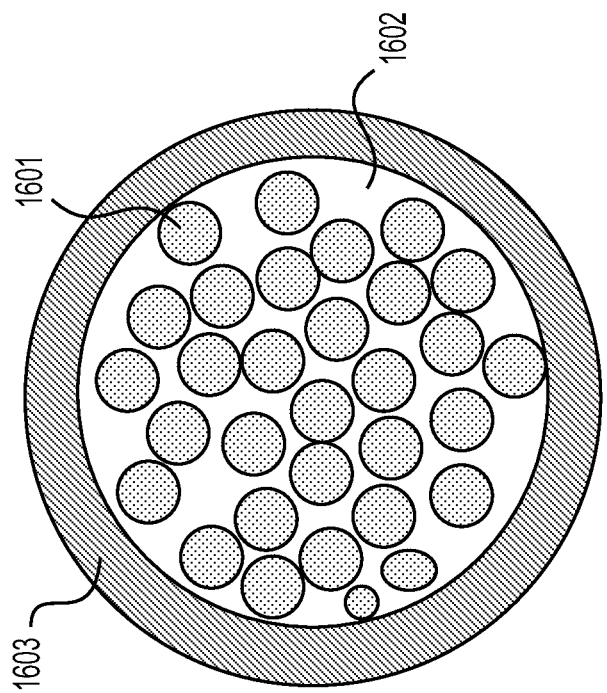
Figure 16D:
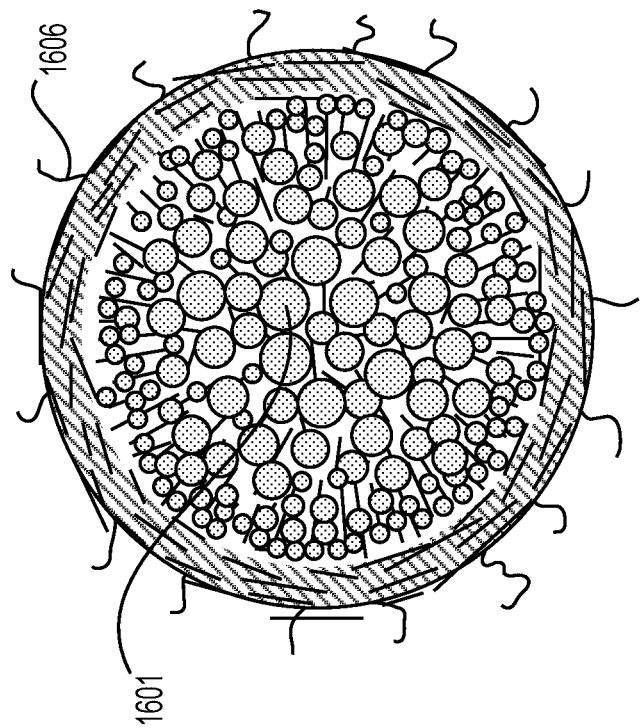
Figure 16C:
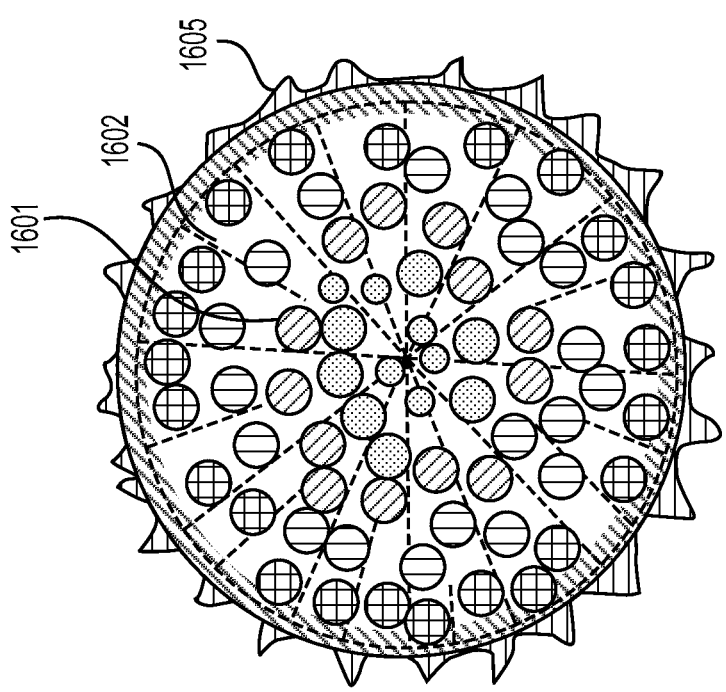

FIGS. 16A-16D illustrate example composite particle compositions according to certain example embodiments, comprising a scaffolding matrix material 1602 and active high capacity material 1601 confined within the scaffolding matrix (and optionally a protective shell), and having a rough or high surface area outer surface. FIG. 16A illustrates an example composite particle with a porous (preferably electrically conductive) surface layer 1603. FIG. 16B illustrates another example composite particle coated with (preferably electrically conductive) nanoparticles 1604. FIG. 16C illustrates yet another example composite particle exhibiting a rough surface coating of preferably electrically conductive material 1605. FIG. 16D illustrates yet another example composite particle coated with nanoflakes, nanowires, or nanotubes of electrically conductive material 1606.

For some designs, the protective shell layer on the surface of the composite particles (which prevents undesirable interaction between the electrolyte and active material) may be electrically isolative or ionically insulative (not conducting active ions, such as Li ion in the case of a Li-ion battery), or both. While access to both electrons and ions may be necessary during operation of a battery (so that electrochemical reactions can proceed), such function(s) may be conducted by the nano-wires, nanotubes, or nano-sheets deposited on the surface or core of the core-shell particles and penetrating through the shell material layer. In this case, these wires/tubes/sheets/particles either (i) ionically connect the inner portion of the core-shell composite particles with electrolyte, (ii) electrically connect the inner portion of the composite particles with other particles and the current collector, or (iii) conduct both functions (provide electrical and ionic pathways to the inner portion of the core-shell composite particles). In cases when the shell material is not conductive for either electrons or ions, or both, this gives more flexibility in the selection of such materials and thus may reduce the core-shell composite cost and improve its mechanical properties. In addition, in cases when the composite is used for a low-voltage anode (e.g., a Si-comprising anode), reduction in the electrical conductivity in the shell may reduce the total SEI formed and thus reduce the cell first cycle losses.

Figure 17B:
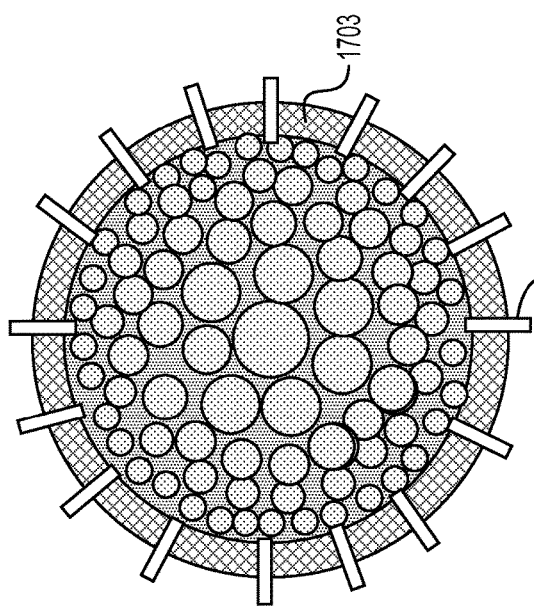
FIGS. 17A-17C illustrate example composite particle compositions according to certain example embodiments, comprising a scaffolding matrix material and high capacity active material confined within the scaffolding matrix and a protective shell, and where conductive particles penetrate through the shell layer.
Figure 17C:
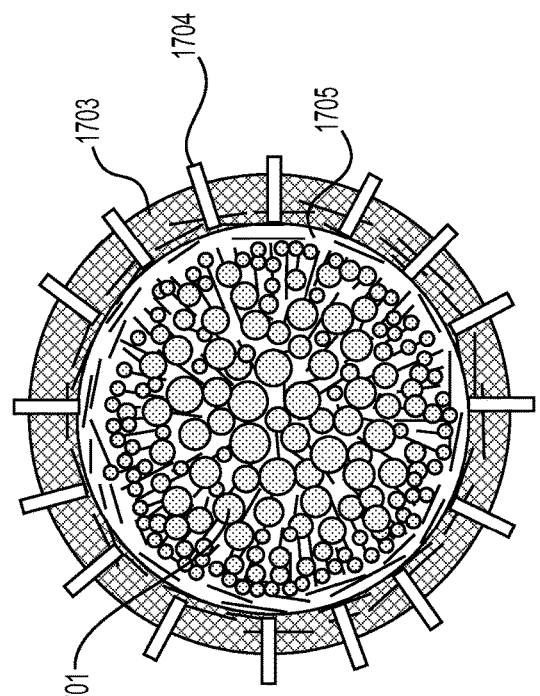
Figure 17A:
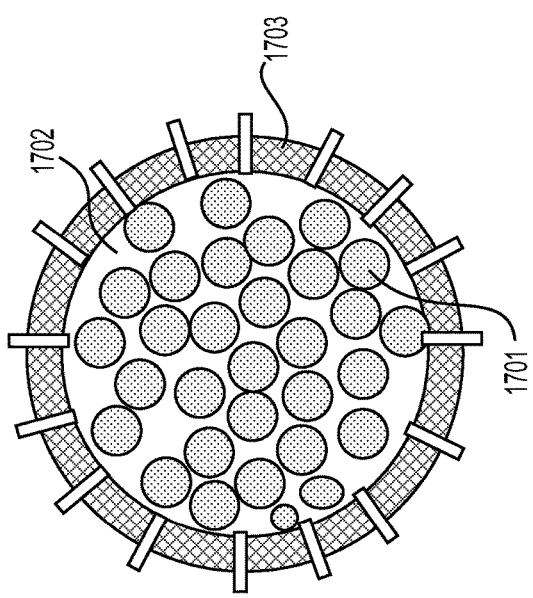

FIGS. 17A-17C illustrate example composite particle compositions according to certain example embodiments, comprising a scaffolding matrix material 1702 and high capacity active material 1701 confined within the scaffolding matrix and a protective shell 1703, and where conductive elements 1704 (e.g., wires, tubes, sheets, or particles) penetrate through the shell layer 1703, without (FIGS. 17A-17B) or with (FIG. 17C) pores 1705.

For some designs, the protective shell may be a responsive composite, which changes either electrical or ionic conductivity upon heating to above 100° C., thus providing a particle-level safety mechanism for batteries (such as flammable Li-ion batteries).

For some designs, at least one property of the active material may change from the center of a composite particle to the perimeter of the composite particle and, at the same time, the composite particle may exhibit a rough or high surface area surface. Such a combination of bulk and surface properties of the composite particles may enhance their performance in cells. As an example, the active material may exhibit changes in particle size from the center to the perimeter of the particle and additionally exhibit a rough (preferably conductive) outer surface (as shown in FIGS. 16B, 16C, and 16D).

For some designs, at least one property of the scaffolding matrix material may change from the center to the perimeter of the composite particle and, at the same time, the composite particle may exhibit a rough or high surface area surface. Such a combination of bulk and surface properties of the composite particles may similarly enhance their performance in cells. As an example, the scaffolding matrix material may exhibit changes in pore size, pore orientation, or pore density from the center to the perimeter of the particle and additionally exhibit a rough (preferably conductive) outer surface (as shown in FIGS. 16B and 16D).

For some designs, at least one property of the scaffolding matrix material may change from the center to the perimeter of the composite particle, and, at the same time, at least one property of the active material may change from the center to the perimeter of the composite particle. Such a combination of bulk and surface properties of the composite particles may similarly enhance their performance in cells.

Various methods may be utilized for the formation of a rough surface of the particles. For example, an outer portion of the porous scaffolding may be coated with particles of various shape (including rough dendritic particles and near spherical particles), fibers, nanowires, or nanoflakes by electrodeposition. As another example, an outer portion of the porous scaffolding material may be coated with particles, nanofibers, nanowires, nanoflakes, or rough dendritic particles by various vapor deposition techniques, including chemical vapor deposition (CVD), including catalyst-assisted CVD, plasma-assisted CVD, and others.

Various methods may be utilized for the formation of a porous coating layer on the surface of composite particles. For example, an outer portion of the porous scaffolding may be exposed to the electrolyte. As another example, the porous layer of an electrically conductive material may be deposited via electrodeposition. As another example, the porous layer may be produced by the deposition of a polymer (or a polymer mixture) layer and its subsequent annealing (and partial decomposition) and optional activation.

LiBr and LiI have not been conventionally used as active cathode materials for Li-ion batteries comprising liquid electrolytes because of the high solubility of such salts in electrolyte solvents and low electrical conductivity. Such materials, however, exhibit high capacity and energy density. In addition, LiBr is relatively inexpensive. Embodiments provided herein may be used to overcome the inherent limitations of LiBr (and LiI) and allow their use as high capacity active cathode materials. As previously described, for some designs, the scaffolding matrix-active material composites may comprise either LiBr or LiI as a high capacity active material for Li-ion battery cathodes. In this case, the pores in the scaffolding matrix may be either closed (preferred, in order to avoid dissolution of $Br_2$ and LiBr in electrolyte) or sealed with an external shell material layer prior to cell assembling, or both (in the last case, the external shell around the LiBr confined in the closed pores of the scaffolding matrix may be added for enhanced robustness, enhanced conductivity, or enhanced dispersion in a slurry or other functions). Furthermore, it may be preferable that the LiBr (or LiI)-comprising scaffold material composites do not exhibit empty pores.

In the case of composite materials comprising LiBr (or LiI) within a scaffolding matrix, it may be beneficial for the scaffold material not to involve any undesirable reactions with liquid $Br_2$ (or $I_2$) produced upon extraction of Li. Therefore, most metals may not work well as scaffolding materials. Instead, metal oxides, conductive carbon, and selected conductive polymers may work well. However, I and Br permeate through most conductive polymers and, in some cases, additionally reduce their conductivity, which is undesirable. Conductive carbon works well as both the scaffolding and the shell material. In some applications, it may be advantageous for the composite particles to have an additional shell comprising a metal oxide. Such an additional shell layer may also comprise traditional intercalation-type cathode material, preferably exhibiting Li insertion and extraction in a similar voltage range as LiBr (or LiI). Lithium iron phosphate is an example of a suitable intercalation-type cathode material. In this case, the probability of I or Br diffusion through the carbon layer into the electrolyte (and eventually irreversibly reducing on the anode) may be minimized.

Various methods of fabricating a battery electrode composition comprising composite particles with enhanced properties are also provided.

For some designs, a suitable method may comprise, for example: (i) forming porous, electrically-conductive scaffolding matrix particles (for example, porous carbon particles) with (physical, microstructural, mechanical, or chemical) properties changing from the center of the particles to the perimeter of the particles; (ii) partially filling the scaffolding matrix particles with an active material to store and release ions during battery operation, whereby the storing and releasing of the ions causes a substantial change in volume of the active material, and wherein the scaffolding matrix structurally supports the active material, electrically interconnects the active material, and accommodates the changes in volume of the active material; (iii) coating the composite particles with a protective layer material (for example, by using chemical vapor deposition methods); and (iv) mixing the produced composite particles with a binder solution and conductive additives, and casting on a conductive metal current collector.

Another suitable method may also comprise, for example: (i) forming multiple suspensions of uniform nanoparticles of active materials coated with a precursor of matrix material (for example, coated with a polymer layer as a precursor for a carbon matrix material); (ii) inducing a gradual aggregation of the largest coated nanoparticles of active material from the nanoparticle suspension; (iii) over time adding a suspension of the smaller and smaller coated nanoparticles so that such smaller and smaller particles are attached to the outer layer of the aggregate particles; (iv) optionally coating the outer layer of the aggregate particles with nanoparticles or a layer of the precursor matrix material; (v) stabilizing the formed aggregate particles (with sizes of their nanoparticle building blocks gradually changing from the center to the outer perimeter) in a suspension and separating them from the solvent: (vi) transforming the precursor material of the matrix to the electrically-conductive scaffolding matrix material (for example, by a thermal treatment), thus obtaining aggregate particles with gradually changing (from the center to the perimeter of the particles) properties, wherein the scaffolding matrix material of each of the composite aggregate particles structurally supports the active material, electrically interconnects the active material, and assists in minimizing changes in volume of the aggregate particles in spite of changes in volume of the active material; (vii) optionally depositing an additional protective layer on the surface (or within the top layer) of the particles by a vapor deposition technique (e.g., by chemical vapor deposition); and (viii) mixing the produced composite particles with a binder solution and conductive additives, and casting on a conductive metal current collector.

One of the useful functions of the scaffolding matrix material particles may be to define dimensions of the composite particles. By controlling the size distribution of the scaffolding matrix particles one can thus control the size distribution of the composite particles. In order to increase the volumetric capacity of the electrode comprising such composite particles it may be advantageous to utilize particles of different size in order to increase the packing density of the composite particles in the electrode. For example, smaller composite particles may be placed in the electrode in the interstitial positions of the larger particles. Smaller particles may also allow electrode to provide faster response to current pulse demands due to smaller diffusion distances. Adding smaller particles to the electrode may also enhance the electrode's mechanical strength and resilience. It may also be advantageous for the material in the smaller and larger scaffolding matrix particles to exhibit different properties (e.g., be more rigid or more conductive in the case of the smaller particles). It may be also advantageous for the material in the smaller and larger composite particles to exhibit different properties or compositions (e.g., use different active materials or different fractions of active material in the smaller and larger particles) in order to achieve the most favorable performance at the cell (or electrode) level. In one example method, an electrode with more favorable properties may be produced by: (i) producing scaffolding matrix material powders of an average size "1" (for generality); (ii) producing scaffolding matrix material powders of an average size "2"; (iii) producing composite particles A from the scaffolding matrix material powders of an average size 1; (iv) producing composite particles B from the scaffolding matrix material powders of an average size 2; and (v) producing an electrode from the mixture of the composite particles/powders A and B.

In some configurations, at least one of the electrodes may be infiltrated with a solid (at room temperature) electrolyte compatible with the electrode in order to prevent undesirable side reactions between a liquid electrolyte and the electrode active material (such as active material dissolution during cycling or irreversible solvent or salt decomposition, to provide a few examples of the side reactions).

Figure 18:
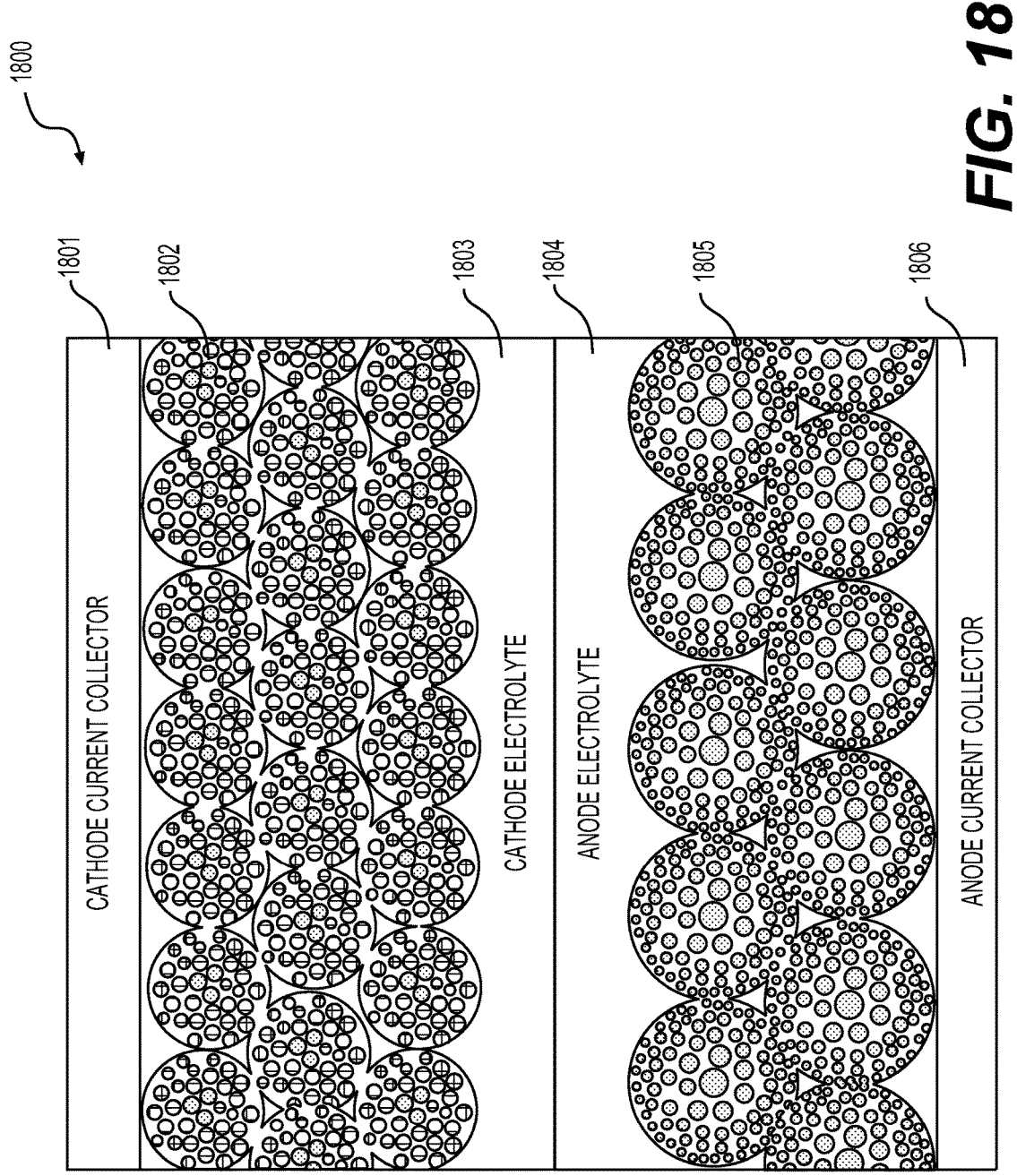
FIGS. 18 and 19 illustrate example battery (e.g., Li-ion battery) building blocks, where two different electrolytes are used for the anode and cathode, respectively, and where at least one electrolyte is solid and infiltrated into the pores between the individual particles of the electrode.
Figure 19:
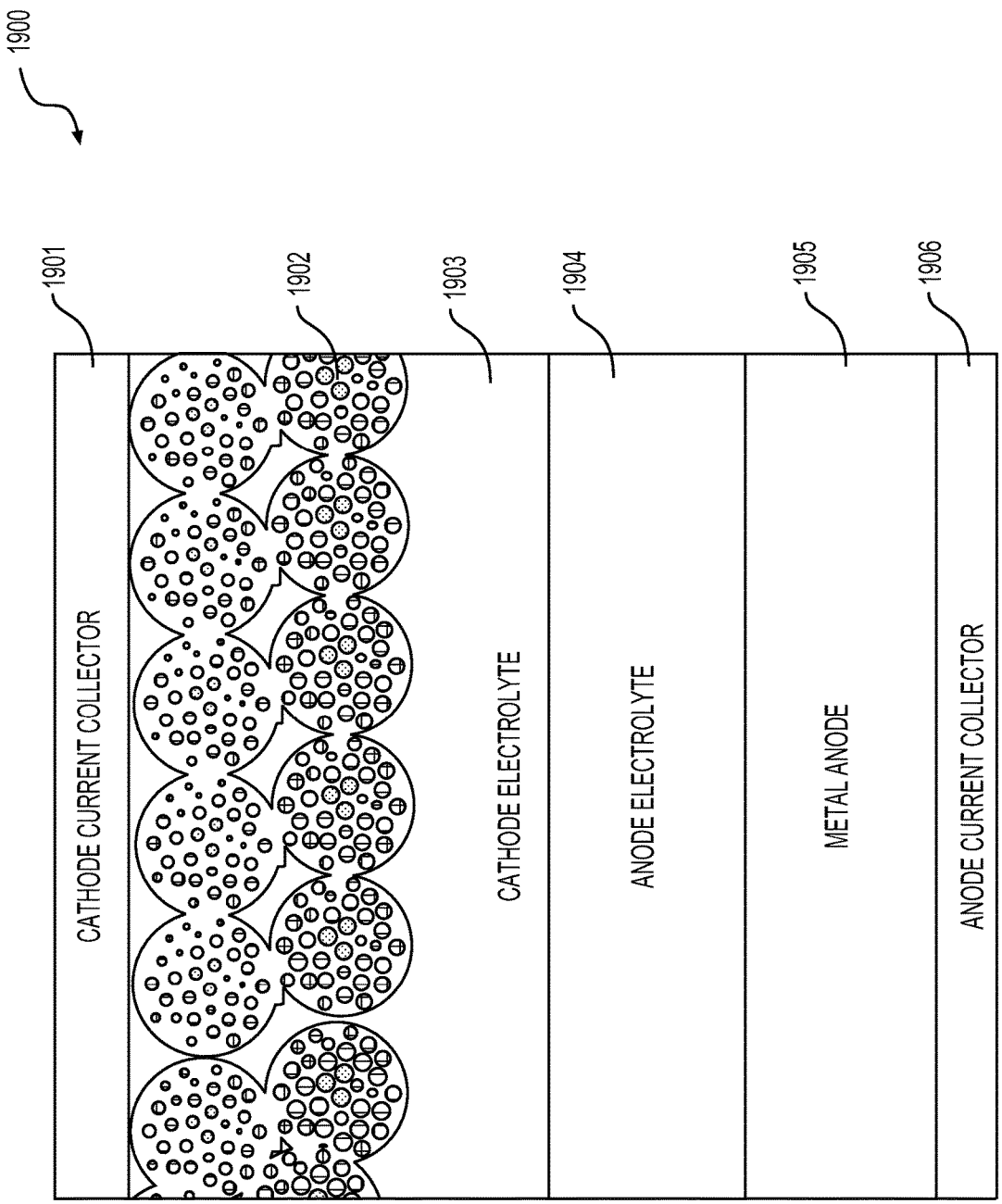

FIGS. 18 and 19 illustrate example battery (e.g., Li-ion battery) building blocks, where two different electrolytes are used for the anode and cathode, respectively, and where at least one electrolyte is solid and infiltrated into the pores between the individual particles of the electrode. The building block example 1800 of FIG. 18 includes (i) a cathode current collector 1801 coated with an electrode composed of cathode particles 1802 and infiltrated with a suitable solid electrolyte 1803, and (ii) an anode current collector 1806 coated with an electrode composed of anode particles 1805 and infiltrated with a suitable solid or liquid electrolyte 1804. In another example, the cathode current collector 1801 coated with an electrode composed of cathode particles 1802 may be infiltrated with a suitable liquid electrolyte, while the anode current collector 1806 coated with an electrode composed of anode particles 1805 may be infiltrated with a suitable solid electrolyte 1804. The building block example 1900 of FIG. 19 includes (i) a cathode current collector 1901 coated with an electrode composed of cathode particles 1902 and infiltrated with a suitable solid electrolyte 1903, and (ii) an anode current collector 1906 coated with a metal anode layer 1905 and coated with a suitable solid electrolyte 1904. In another example, the cathode current collector 1901 coated with an electrode composed of cathode particles 1902 may be infiltrated with a suitable liquid electrolyte, while the anode current collector 1906 coated with a metal anode layer 1905 may be coated with a separator membrane infiltrated with a suitable liquid electrolyte 1904.

Good compatibility between the active material and a solid electrolyte may be helpful in preventing damage to the active material and achieving favorable performance at an electrode- or cell-level over a broad temperature range of cell operation and the broad range of potentials of electrode operation. In one suitable example, a halide-based conversion cathode (for example, a fluoride-based cathode) may be melt-infiltrated (or, vapor infiltrated) with a halide-based (or oxy-halide based) solid electrolyte. The composition of the halide electrolyte may be selected to exhibit a melting point from around 100° C. to around 600° C. (for example, by selecting a eutectic composition of such an electrolyte). The solid electrolytes may also be preferably selected to exhibit sufficiently high Li-ion conductivity (e.g., greater than 0.005 mS/cm) in the temperature range from around 0° C. to around 100° C.). In another suitable example, a halide-based conversion cathode (for example, a fluoride-based cathode) may be melt-infiltrated (or vapor infiltrated) with a nitrate-based solid electrolyte. The composition of the nitrate electrolyte may be selected to exhibit a melting point from around 100° C. to around 500° C. Similarly, the solid electrolytes may also be preferably selected to exhibit sufficiently high Li-ion conductivity (e.g., greater than 0.005 mS/cm) in the temperature range from around 0° C. to around 100° C.). In yet another example, a sulfide-based conversion cathode may be infiltrated with a sulfide-based solid electrode. Such an infiltration may also take place through a series of vapor and liquid infiltration steps and may be followed by an electrode annealing at a temperature from around 80° C. to around 600° C., depending on the electrolyte composition. In yet another example, a high voltage intercalation-type cathode (e.g., a cathode with an average working potential in the range from around 3.9 to around 5.5 V vs. Li/Li$^+$) that exhibits a specific capacity in the range from around 140 to around 340 mAh/g may be melt-infiltrated with a halide-based (or oxy-halide based) solid electrolyte having a melting point from around 100° C. to around 600° C. The solid electrolytes may preferably be selected to exhibit sufficiently high Li-ion conductivity (e.g., greater than 0.005 mS/cm) in the temperature range from around 0° C. to around 100° C.

While some of the above-discussed electrolytes may have been previously investigated (e.g., for Li, Li-ion, F-ion, Cl-ion and other types of batteries), their combination with the above-discussed high-energy cathode materials and implementation of the melt-infiltration or vapor-infiltration steps provides substantial improvements in cell stability and energy density. Furthermore, the present disclosure provides for overcoming the inherent limitations of many cells comprising such electrolytes and low potential (e.g., 0-1.5 V vs. Li/Li+) anodes by utilizing a suitable liquid or a suitable solid electrolyte for the anode side of the cell.

Selection of suitable liquid electrolytes for use in the anodes (in combination with cathodes infiltrated with solid electrolyte) depends on the relevant anode and solid electrolyte chemistry. The following provides illustrative examples of the classes of solvents that may be a part of suitable liquid electrolytes that work well for many Li-ion, Na-ion, rechargeable Li and rechargeable Na batteries (in combination with solid-electrolyte-infiltrated cathodes): (i) esters, (ii) sulfones, (iii) sulfoxides, (iv) nitriles, (v) phosphorous-based solvents, (vi) silicon-based solvents, (vii) ether-based solvents, and (viii) carbonate-based solvents. Esters, ether-based solvents, and carbonate-based solvents may be particularly attractive for electrolytes used for low-potential (0-1.5 V vs. Li/Li+) anodes. Illustrative examples of such anodes may include anodes comprising Si, Al, Sn, and other alloying-type anode materials, C (e.g., graphite) and Li (e.g., as Li or Li alloy), to name a few. Solvents comprising ethers or ether-based compounds may be particularly attractive for battery cells with Li-comprising anodes. Illustrative examples of salts that may be a part of the suitable liquid electrolyte for Li-ion, Na-ion, rechargeable Li and rechargeable Na batteries (in combination with solid-electrolyte-infiltrated cathodes) may include: $LiPF_6$, $LiBF_4$, $LiClO_4$, lithium imides (e.g., $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others), lithium halides (e.g., LiF, LiI, LiCl, LiBr), other lithium phosphates (e.g., lithium tris[1,2-benzenediolato(2-)-O,O']phosphate, lithium tris[3-fluoro-1,2,2-benzenediolato(2-)-O,O']phosphate, lithium tris(oxalate) phosphate, lithium tetrafluorooxalato phosphate, etc.), other lithium borates (e.g., lithium perfluoroethyl trifluoroborate, lithium (malonatooxalato)borate, lithium bi(polyfluorodiolato)borate, lithium difluoro(oxalate)borate, lithium tetracyanoborate, dilithium dodecafluoro dodecarborate, etc.), lithium aluminates (e.g., lithium tetra(1,1,1,3,3,3-hexafluoro-iso-propyl)aluminate, lithium tetra(1,1,1,3,3,3-hexafluoro-2-butyl)aluminate, lithium tetra(1,1,1,3,3,3-hexafluoro-2-propylphenyl)aluminate, lithium tetra(perfluorobutyl)aluminate, etc.) and their combinations, to name a few suitable Li salts (as well as analogous Na salts). Salts comprising $LiPF_6$, $LiBF_4$, $LiClO_4$, lithium imides or lithium halides may be particularly attractive for the battery cells with Li-comprising anodes (as well as analogous Na salts for Na-comprising anodes). In conventional Li-ion or rechargeable Li batteries only Li-based salts are utilized (mostly $LiPF_6$). However, a mixture of Li and non-Li salts (e.g., (i) salts of rare earth elements, such as La, Y, Sc, Ce, etc., (ii) salts of some of the suitable alkaline metals, such as Mg, Ca, Sr, Cs, Ba, and (iii) salts of some of the suitable transition metals, such as Zr, Hf, Ta, Cu) may be advantageous for some aspects of the present disclosure. The same may also apply for the Na-ion or rechargeable Na batteries. In conventional Li-ion, Na-ion or rechargeable Li or Na batteries, the liquid electrolyte salt concentration typically ranges from around 0.8M to around 1.2M. However, a higher salt concentration (e.g., from approximately 1.5M to approximately 6M) may be advantageous for some aspects of the present disclosure.

In some configurations, a polymer electrolyte may be used instead of the liquid electrolyte for low-potential (0-1.5 V vs. Li/Li+) anodes (e.g., anodes comprising Si, Al, Sn, or other alloying-type anode materials, C (e.g., graphite) or Li (e.g. Li or Li alloy), etc.). In some configurations, the polymer electrolyte infiltration may proceed in a liquid phase.

Selection of suitable liquid electrolytes for use in the cathodes (in combination with anodes infiltrated with a solid electrolyte or coated with a solid electrolyte) depends on the relevant anode, cathode, and solid electrolyte chemistry. The following provide illustrative examples of the classes of solvents that may be a part of suitable liquid electrolytes that work well for many Li-ion, Na-ion, rechargeable Li and rechargeable Na batteries (in combination with solid-electrolyte-infiltrated anodes or solid-electrolyte-coated anodes): (i) esters, (ii) sulfones, (iii) sulfoxides, (iv) nitriles, (v) phosphorous-based solvents, (vi) silicon-based solvents, (vii) ether-based solvents, (viii) carbonate-based solvents, (ix) fluorinated analogs of these solvents, and their combinations. Esters, ether-based solvents, and carbonate-based solvents may work well for electrolytes used with a moderate potential (1.5-4.0 V vs. Li/Li+) cathodes (e.g., fluoride-based or sulfide-based cathodes). Nitriles and some of the fluorinated solvents may work particularly well for electrolytes used with a high potential (4.0-5.5 V vs. Li/Li+) cathodes (e.g., polyanion based cathodes). Illustrative examples of salts that may be a part of the suitable liquid electrolyte for Li-ion, Na-ion, rechargeable Li and rechargeable Na batteries (in combination with solid-electrolyte-infiltrated or solid electrolyte-coated anodes) may include: $LiPF_6$, $LiBF_4$, $LiClO_4$, lithium imides (e.g., $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others), lithium halides (e.g., LiF, LiI, LiCl, LiBr), other lithium phosphates (e.g., lithium tris[1,2-benzenediolato(2-)-O,O']phosphate, lithium tris[3-fluoro-1,2,2-benzenediolato(2-)-O,O']phosphate, lithium tris(oxalate) phosphate, lithium tetrafluorooxalato phosphate, etc.), other lithium borates (e.g., lithium perfluoroethyl trifluoroborate, lithium (malonatooxalato)borate, lithium bi(polyfluorodiolato)borate, lithium difluoro(oxalate)borate, lithium tetracyanoborate, dilithium dodecafluoro dodecarborate, etc.), lithium aluminates (e.g., lithium tetra(1,1,1,3,3,3-hexafluoro-iso-propyl)aluminate, lithium tetra(1,1,1,3,3,3-hexafluoro-2-butyl)aluminate, lithium tetra(1,1,1,3,3,3-hexafluoro-2-propylphenyl)aluminate, lithium tetra(perfluorobutyl)aluminate, etc.) and their combinations, to name a few suitable Li salts (as well as analogous Na salts). Salts comprising $LiPF_6$, $LiBF_4$ or lithium imides may be particularly attractive for battery cells comprising high voltage (4-5.5 V vs. Li/Li+) cathodes (as well as analogous Na salts for Na-ion and rechargeable Na batteries). In conventional Li-ion or rechargeable Li batteries, only Li-based salts are utilized (mostly LiPF$_6$). However, a mixture of Li and non-Li salts (e.g., (i) salts of rare earth elements, such as La, Y, Sc, Ce, etc., (ii) salts of some of the suitable alkaline metals, such as Mg, Ca, Sr, Cs, Ba, and (iii) salts of some of the suitable transition metals, such as Zr, Hf, Ta, Cu) may be advantageous for some aspects of the present disclosure. The same may also apply for the Na-ion or rechargeable Na batteries. In conventional Li-ion, Na-ion or rechargeable Li or Na batteries, the liquid electrolyte salt concentration typically ranges from around 0.8M to around 1.2M. However, a higher salt concentration (e.g., from approximately 1.5M to approximately 6M) may be advantageous for some aspects of the present disclosure.

In some configurations, one of the electrodes may be infiltrated (filled) with a solid electrolyte prior to cell assembly, while another electrode is infiltrated with a second type of electrolyte (which may be either solid or liquid) after cell stack assembly, but prior to the final sealing.

One consideration is the lack of unfavorable interactions between the two types of electrolytes. The rationale for the use of a combination of different electrolytes for anodes and cathodes may be related to their compatibilities. For example, the use of a halide or oxyhalide (and, in some cases, nitrate, nitrite, and nitride) electrolyte may be advantageous for conversion-type cathodes (for example, metal fluoride-based) and, in some cases (for example, in the case of many halide or oxyhalide electrolytes), high voltage polyanion intercalation type cathodes (particularly those with an average Li extraction potential in the range from around 3.9 to around 5.5 V vs. Li/Li+) because of the stability of most of the halide electrolytes in the corresponding voltage range (for example, from around 2 to around 5.5 V vs. Li/Li$^+$). Nitrate based electrolytes are commonly stable to around 4-4.5 V vs. Li/Li+.

Many halide, oxyhalide, nitrate, nitrite, nitride and other electrolytes may be melt-infiltrated and thus offer high volumetric capacity to the electrodes. However, some halide-based electrolytes and some polymer electrolytes are not stable at the low potential of some of the anodes (for example, from around 0 to around 1.5 V vs. Li/Li+), which may prohibit their direct electrical contact with such anodes in cells. In contrast, many known liquid electrolytes and some solid (for example, polymer based and nitrate, nitrite, and nitride) electrolytes may be compatible with low potential anode materials (for example, those operating in the range from around 0 to around 2 V vs. Li/Li+ during cycling), at least after forming a so-called solid electrolyte interphase (SEI) layer on these anodes. However, they may oxidize at high potentials (for example, at above around 4 V vs. Li/Li+), thereby inducing gases into cells, or may induce undesirable interactions with a cathode active material (e.g., dissolution of at least some portions of such an active material or formation of undesirable interphase species).

In another example, a given solid electrolyte may be difficult to infiltrate into a porous structure of an electrode without reducing its volumetric capacity. In some configurations, it may be preferable to use such an electrolyte with a flat metal anode (for example, with Li metal or a Li-comprising anode in the case of Li cells) and use another electrolyte (less useful in combination with such an anode) that could be successfully and efficiently infiltrated into a cathode without reduction of the cathode volumetric capacity (for example, if such an electrolyte may be infiltrated in a liquid state). In other examples, it is possible to effectively melt-infiltrate two solid electrolytes in the anode and cathode, respectively (for example, infiltrate a halide electrolyte into a high voltage or conversion-type cathode and Li$_3$N into an alloying-type anode). All such configurations may be particularly useful for rechargeable metal and metal-ion cells (such as Li-ion and rechargeable Li cells).

Figure 20:
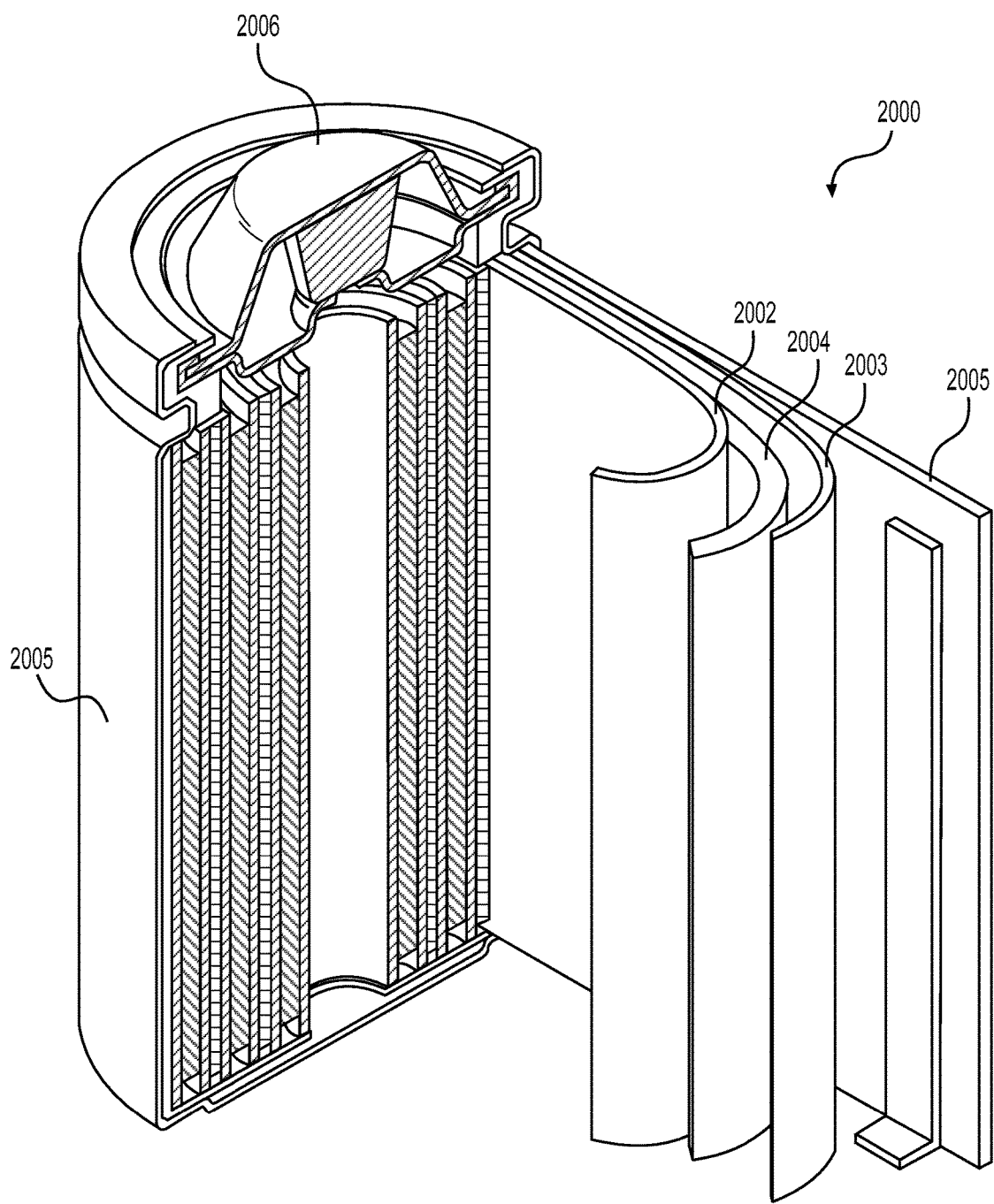
FIG. 20 illustrates an example battery (e.g., a Li-ion battery) in which the components, materials, methods, and other techniques described herein, or combinations thereof, may be applied according to various embodiments.

FIG. 20 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 2000 includes a negative anode 2002, a positive cathode 2003, a separator 2004 interposed between the anode 2002 and the cathode 2003, an electrolyte (not shown) impregnating the separator 2004, a battery case 2005, and a sealing member 2006 sealing the battery case 2005.

For some designs, a battery electrode composition is provided, where the electrode changes properties (e.g., composition, mechanical properties, microstructure, density, porosity, average pore size, etc.) from the surface of the electrode to the interface with a current collector (such as a metal foil). In some configurations, producing a gradient at the electrode level may be advantageously combined with a gradient in properties at the particle level.

For some designs, the described change(s) in electrode properties may be achieved in particle-based electrodes, where, for example, different particles (e.g., particles of different size, different composition, different density, etc.), different amounts (or relative fraction or composition) of the binder, or different amounts (or relative fraction or composition) of conductive additives may be used across the electrode thickness. Such an approach may slightly complicate the electrode fabrication, but provides multiple benefits. For example, higher porosity (larger open space between the individual particles) near the electrode surface may improve electrolyte access to the inner (deeper) electrode areas, thus enhancing electrode rate performance. When compared to a uniform electrode of the same density, an electrode with rationally optimized gradient properties may exhibit not only higher rate, but also longer cycle life, because electrode particles are more equally stressed (charged-discharged) during cycling (e.g., more equally lithiated and delithiated in the case of Li-ion batteries). Overcharge or over-discharge of high capacity materials are known to induce faster degradation. Therefore, if some of the electrode particles (e.g., near the top/surface layer of the electrode) degrade, the whole cell may fade rapidly. Volume changes within individual high capacity particles in excess of around 8% may induce significant stresses at the interface with current collectors (e.g., Cu in the case of low potential Li-ion battery anodes or Al in case of Li-ion battery cathodes), which may result in plastic deformation and fracture of the current collectors or failure of the electrode/current collector interfaces. Therefore, providing electrodes that exhibit lower volume changes near such interfaces may significantly improve cell stability.

Different profiles within the electrode thickness may be produced by several approaches, including casting electrodes in multiple (thinner) layers (each layer may be cast from a separate slurry of the controlled composition) or casting using specially designed extruders that may incorporate multiple layers (each extruded from a separate slurry container). The first approach (casting a single electrode of the desired thickness by subsequent application and drying of multiple thinner layers of electrode compositions) has an additional advantage of reducing the slurry solvent drying time and minimizing the stresses within the electrode occurring during such a drying process. Reduction in the drying time may significantly reduce the cost of electrode fabrication. As a result, thicker electrodes (with variable composition across their thicknesses) may exhibit better properties and, at the same time, be produced at a reduced cost.

For some designs, the above-discussed change(s) in electrode properties across the electrode thickness (such as density, porosity, composition, etc.) may be achieved in an electrode that is not based on polymer-bonded individual particles, but is monolithic. In this case, it can be considered to be a single large sheet-shaped composite particle.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A battery electrode composition comprising composite particles, each composite particle comprising:
   a high-capacity active material provided to store and release ions during battery operation, wherein the active material exhibits (i) a specific capacity of at least 220 mAh/g as a cathode active material or (ii) a specific capacity of at least 400 mAh/g as an anode active material;
   a porous, electrically-conductive scaffolding matrix material within the pores of which the active material is disposed; and
   a shell at least partially encasing the active material and the scaffolding matrix material,
   wherein each composite particle includes a first region from the center to a first radius that is halfway to a perimeter of the scaffolding matrix material and a second region from the center to a second radius at the perimeter the scaffolding matrix material, and
   wherein each composite particle exhibits at least one average material property that is different in the first and second regions and that changes from the center to the perimeter of the scaffolding matrix material.

2. The battery electrode composition of claim 1, wherein the active material is an anode active material and comprises silicon.

3. The battery electrode composition of claim 1, wherein the active material is a cathode active material and comprises fluorine.

4. The battery electrode composition of claim 1, wherein the scaffolding matrix material comprises carbon.

5. The battery electrode composition of claim 1, wherein the at least one average material property comprises a material composition of the scaffolding matrix material that changes from the center to the perimeter of the scaffolding matrix material.

6. The battery electrode composition of claim 5, wherein the shell is substantially permeable to the ions stored and released by the active material and forms a barrier between the active material and an electrolyte solvent.

7. The battery electrode composition of claim 1, wherein the at least one average material property comprises a mechanical property of the scaffolding matrix material that changes from the center to the perimeter of the scaffolding matrix material.

8. The battery electrode composition of claim 7, wherein the mechanical property includes a lower elastic modulus or lower hardness near the center of the scaffolding matrix material as compared to the perimeter of the scaffolding matrix material.

9. The battery electrode composition of claim 1, wherein the at least one average material property comprises a degree of disorder of the scaffolding matrix material that changes from the center to the perimeter of the scaffolding matrix material.

10. The battery electrode composition of claim 1, wherein the at least one average material property comprises an average pore size of the scaffolding matrix material that changes from the center to the perimeter of the scaffolding matrix material.

11. The battery electrode composition of claim 10, wherein the average pore size is larger near the center of the scaffolding matrix material as compared to the perimeter of the scaffolding matrix material.

12. The battery electrode composition of claim 10, wherein the average pore size is larger near the center of the scaffolding matrix material and the perimeter of the scaffolding matrix material as compared to an intermediate region of the scaffolding matrix located between the center and the perimeter.

13. The battery electrode composition of claims 10, wherein the average pore size in the center of the scaffolding matrix material particles is in the range of about 2 nm to about 100 nm.

14. The battery electrode composition of claim 1, wherein the at least one average material property comprises a pore orientation of the scaffolding matrix material that changes from the center to the perimeter of the scaffolding matrix material.

15. The battery electrode composition of claim 1, wherein the at least one average material property comprises a volume fraction of the active material to the scaffolding matrix material that changes from the center to the perimeter of the scaffolding matrix material.

16. The battery electrode composition of claim 1, wherein the at least one average material property comprises a material composition of the active material that changes from the center to the perimeter of the scaffolding matrix material.

17. The battery electrode composition of claim 16, wherein the material composition includes a first active material that is more concentrated near the center of the scaffolding matrix material and a second active material that is more concentrated near the perimeter of the scaffolding matrix material, and wherein the first active material has a higher energy density than the second active material.

18. The battery electrode composition of claim 1, wherein the at least one average material property comprises a density of the composite particle that changes from the center to the perimeter of the scaffolding matrix material.

19. The battery electrode composition of claim 18, wherein the density is higher near the center of the scaffolding matrix material as compared to the perimeter of the scaffolding matrix material.

20. The battery electrode composition of claim 1, wherein the shell is formed of a thermally-sensitive material that substantially reduces its electrical or ionic conductivity at temperatures above about 80° C.

21. The battery electrode composition of claim 1, wherein each composite particle exhibits a surface roughness characterized by a peak-to-valley difference in the range of about 1 nm to about 500 nm.

22. The battery electrode composition of claim 1, wherein the shell is a conductive carbon shell.

23. A metal-ion battery, comprising:
ion-permeable anode and cathode electrodes, wherein at least one of the electrodes comprises the battery electrode composition of claim 1;
an electrolyte ionically coupling the anode and the cathode electrodes; and
a separator electrically separating the anode and the cathode electrodes.

24. A method of fabricating a battery electrode composition comprising composite particles, the method comprising:
providing a high-capacity active material to store and release ions during battery operation, wherein the active material exhibits (i) a specific capacity of at least 220 mAh/g as a cathode active material or (ii) a specific capacity of at least 400 mAh/g as an anode active material;
forming a porous, electrically-conductive scaffolding matrix material within the pores of which the active material is disposed; and
forming a shell at least partially encasing the active material and the scaffolding matrix material,
wherein each composite particle includes a first region from the center to a first radius that is halfway to a perimeter of the scaffolding matrix material and a second region from the center to a second radius at the perimeter the scaffolding matrix material, and
wherein each composite particle is formed with at least one average material property that is different in the first and second regions and that changes from the center to the perimeter of the scaffolding matrix material.

25. The method of claim 24, wherein the forming comprises introducing one or more functional groups within the scaffolding matrix material with a distribution that changes from the center to the perimeter of the scaffolding matrix material.

26. The method of claim 24, wherein the forming comprises infiltrating the active material into the scaffolding matrix material.

27. The battery electrode composition of claim 1, wherein the at least one average material property is exhibited in the scaffolding matrix material of the in the first and second regions of each composite particle.

28. The battery electrode composition of claim 1,
wherein each composite particle further includes a third region from the center to a third radius of the scaffolding matrix material, and
wherein the at least one average material property in each composite particle is different in each of the first, second and third regions.

29. The battery electrode composition of claim 1, wherein the first and/or second regions of a first subset of the composite particles exhibits the at least one average material property differently than the first and/or second regions, respectively, of a second subset of the composite particles.

* * * * *

UNITED STATES PATENT AND TRADEMARK OFFICE
CERTIFICATE OF CORRECTION

| | |
|---|---|
| PATENT NO. | : 10,340,520 B2 |
| APPLICATION NO. | : 14/882166 |
| DATED | : July 2, 2019 |
| INVENTOR(S) | : Gleb Yushin et al. |

It is certified that error appears in the above-identified patent and that said Letters Patent is hereby corrected as shown below:

In the Specification

At Column 1, Line 13, and directly preceding the BACKGROUND header, please insert:
-- GOVERNMENT LICENSE RIGHTS
This invention was made with government support under Award ID DE-AR0000265 awarded by the Advanced Research Projects Agency-Energy (ARPA-E) within the United States Department of Energy (DOE). The government has certain rights in the invention. --

Signed and Sealed this
Third Day of January, 2023

Katherine Kelly Vidal
*Director of the United States Patent and Trademark Office*